(12) United States Patent
Giuliano

(10) Patent No.: US 12,040,702 B2
(45) Date of Patent: Jul. 16, 2024

(54) MULTI-LEVEL STRUCTURES AND METHODS FOR SWITCHED-MODE POWER SUPPLIES

(71) Applicant: Murata Manufacturing Co., Ltd., Kyoto (JP)

(72) Inventor: David M. Giuliano, Bedford, NH (US)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 17/559,945

(22) Filed: Dec. 22, 2021

(65) Prior Publication Data

US 2022/0416653 A1    Dec. 29, 2022

Related U.S. Application Data

(60) Provisional application No. 63/214,474, filed on Jun. 24, 2021.

(51) Int. Cl.
*H02M 3/07* (2006.01)
*H02M 3/00* (2006.01)
(Continued)

(52) U.S. Cl.
CPC .......... *H02M 3/07* (2013.01); *H02M 3/005* (2013.01); *H02M 3/1557* (2021.05);
(Continued)

(58) Field of Classification Search
CPC ...... H02M 1/0095; H02M 3/005; H02M 3/18; H02M 3/07; H02M 3/33576; H02M 7/4835
See application file for complete search history.

(56) References Cited

U.S. PATENT DOCUMENTS

| | | | |
|---|---|---|---|
| 656,522 A * | 8/1900 | Déri | H02M 1/22 363/108 |
| 4,257,087 A * | 3/1981 | Cuk | H02M 3/005 363/16 |

(Continued)

FOREIGN PATENT DOCUMENTS

| | | |
|---|---|---|
| CN | 110545040 | 12/2019 |
| CN | 111697821 | 9/2020 |
| WO | 2023/081610 | 5/2023 |

OTHER PUBLICATIONS

Szczeszynski, Gregory, "Controlling Charge-Balance and Transients in a Multi-Level Power Converter:", patent application filed in the USPTO on Dec. 23, 2021, U.S. Appl. No. 17/560,767, 78 pgs.
(Continued)

*Primary Examiner* — Yusef A Ahmed
(74) *Attorney, Agent, or Firm* — JAQUEZ LAND GREENHAUS & MCFARLAND LLP; John Land, Esq.

(57) ABSTRACT

Methods for modifying converter cells for switched-mode power converters, and corresponding power converter cells. The modified converter cells exhibit reduced inductance requirements, enable use of lower voltage and smaller switches, provide improved power density and efficiency, and provide for improved input/output voltage dynamic range. Embodiments of the methods generate converter cell topologies having 3 or more node voltage levels by successively applying a "split switches and connect through a capacitor" operation. The inventive processes, or variants of those processes, may be applied to converter cell topologies that are 2-level converter cells including at least one inductance and two switches, and particularly 2-level converter cells including either (1) an order of at least 3 (i.e., 3 or more energy storage elements in some combination of inductances and capacitances, but with at least one inductance) and at
(Continued)

least 2 switches, or (2) at least 1 designed-in inductance and at least 4 switches.

17 Claims, 25 Drawing Sheets

(51) Int. Cl.
*H02M 3/155* (2006.01)
*H02M 3/158* (2006.01)
*H02M 3/335* (2006.01)
*H02M 7/483* (2007.01)

(52) U.S. Cl.
CPC ....... *H02M 3/158* (2013.01); *H02M 3/33576* (2013.01); *H02M 7/4837* (2021.05); *H02M 7/4835* (2021.05)

(56) References Cited

U.S. PATENT DOCUMENTS

| | | | | |
|---|---|---|---|---|
| 4,654,769 | A * | 3/1987 | Middlebrook | H02M 3/158 363/16 |
| 4,720,668 | A * | 1/1988 | Lee | H02M 3/155 323/235 |
| 5,969,484 | A * | 10/1999 | Santi | H05B 41/28 315/307 |
| 6,294,900 | B1 * | 9/2001 | Greenwood | H02M 3/005 323/222 |
| 6,304,460 | B1 * | 10/2001 | Cuk | H02M 1/34 363/16 |
| 8,159,200 | B2 * | 4/2012 | Lesso | H02M 3/158 323/271 |
| 9,160,232 | B2 | 10/2015 | Thomas et al. | |
| 9,337,732 | B2 | 5/2016 | Kondou | |
| 9,571,006 | B2 * | 2/2017 | Stahl | H02M 7/53871 |
| 9,641,071 | B2 * | 5/2017 | Logiudice | H02M 3/157 |
| 9,748,841 | B2 | 8/2017 | Granato | |
| 9,899,918 | B2 | 2/2018 | Lee | |
| 10,090,763 | B1 * | 10/2018 | Mercer | H02M 3/1582 |
| 10,523,121 | B2 * | 12/2019 | Zhao | H02M 3/07 |
| 10,547,241 | B1 * | 1/2020 | Li | H02M 3/1588 |
| 10,686,367 | B1 * | 6/2020 | Low | H02M 1/36 |
| 10,720,842 | B1 * | 7/2020 | Wu | H02M 3/1584 |
| 10,720,843 | B1 * | 7/2020 | Wu | H02M 3/1584 |
| 10,770,974 | B2 | 9/2020 | Wu et al. | |
| 10,992,226 | B1 | 4/2021 | Aboueldahab et al. | |
| 11,646,665 | B2 * | 5/2023 | Wu | H02M 1/0045 327/109 |
| 11,695,333 | B2 * | 7/2023 | Rentmeister | H02M 3/07 363/59 |
| 2006/0087295 | A1 * | 4/2006 | Jang | H02M 3/1584 323/222 |
| 2006/0103359 | A1 * | 5/2006 | Watanabe | H02M 3/1584 323/225 |
| 2009/0001955 | A1 * | 1/2009 | Yoshida | H02M 3/158 323/282 |
| 2009/0059630 | A1 * | 3/2009 | Williams | H02M 3/1588 363/60 |
| 2009/0189393 | A1 * | 7/2009 | Tyagi | H02P 9/48 322/17 |
| 2010/0052050 | A1 | 3/2010 | Lofti et al. | |
| 2010/0259240 | A1 * | 10/2010 | Cuk | H02M 1/4258 323/299 |
| 2011/0057640 | A1 * | 3/2011 | Cuk | H02M 3/155 323/311 |
| 2012/0194164 | A1 * | 8/2012 | Logiudice | H02M 3/156 323/312 |
| 2012/0262967 | A1 * | 10/2012 | Cuk | H02M 7/4807 363/131 |
| 2012/0268969 | A1 * | 10/2012 | Cuk | H02M 7/48 363/37 |
| 2013/0088211 | A1 * | 4/2013 | Radtke | H02M 3/005 323/282 |
| 2014/0232364 | A1 * | 8/2014 | Thomas | H02M 7/4833 323/271 |
| 2014/0265994 | A1 * | 9/2014 | Mao | H02K 17/14 318/773 |
| 2015/0003127 | A1 | 1/2015 | Takizawa | |
| 2015/0043254 | A1 * | 2/2015 | Preckwinkel | H02M 7/5395 363/41 |
| 2015/0230302 | A1 * | 8/2015 | Ito | H05B 45/3725 315/77 |
| 2016/0118817 | A1 * | 4/2016 | Uno | H02M 3/005 320/166 |
| 2016/0197552 | A1 * | 7/2016 | Giuliano | H02M 3/07 363/60 |
| 2016/0301348 | A1 * | 10/2016 | Mao | H02K 3/28 |
| 2016/0359415 | A1 * | 12/2016 | Friebe | H02M 7/48 |
| 2018/0026518 | A1 * | 1/2018 | Liu | H02M 1/088 323/312 |
| 2018/0062507 | A1 * | 3/2018 | Giuliano | H02M 3/07 |
| 2018/0123341 | A1 * | 5/2018 | Lehn | H02M 1/15 |
| 2018/0131281 | A1 * | 5/2018 | Inoue | H02M 3/285 |
| 2019/0109530 | A1 * | 4/2019 | Perreault | H02M 1/083 |
| 2019/0115830 | A1 * | 4/2019 | Giuliano | H02M 3/158 |
| 2019/0199221 | A1 * | 6/2019 | Zhao | H02M 3/33573 |
| 2019/0319526 | A1 | 10/2019 | Yang | |
| 2020/0228014 | A1 * | 7/2020 | Wu | G05F 1/577 |
| 2020/0228015 | A1 * | 7/2020 | Wu | H02M 3/158 |
| 2020/0228016 | A1 * | 7/2020 | Wu | H02M 1/08 |
| 2020/0243744 | A1 * | 7/2020 | Chaput | H10N 30/802 |
| 2021/0067057 | A1 * | 3/2021 | Abarzadeh | H02M 7/4837 |
| 2021/0296983 | A1 * | 9/2021 | Rentmeister | H02M 1/0095 |
| 2021/0367430 | A1 * | 11/2021 | Da Silva | H02M 3/158 |
| 2022/0006382 | A1 * | 1/2022 | Wu | H02M 7/4837 |
| 2022/0069685 | A1 * | 3/2022 | Mao | H02K 16/02 |
| 2022/0190712 | A1 * | 6/2022 | Chen | H02M 1/4225 |
| 2022/0190738 | A1 * | 6/2022 | Chen | H02M 1/007 |
| 2022/0224231 | A1 * | 7/2022 | Rizzolatti | H02M 1/0095 |
| 2022/0247310 | A1 * | 8/2022 | Wittenbreder, Jr. | H02M 3/07 |
| 2022/0321010 | A1 * | 10/2022 | Bieber | H02M 3/33561 |
| 2022/0416653 | A1 | 12/2022 | Giuliano | |
| 2022/0416664 | A1 * | 12/2022 | Wu | H02M 3/1584 |
| 2023/0083355 | A1 * | 3/2023 | Bishnoi | H02M 1/325 363/13 |
| 2023/0136027 | A1 | 5/2023 | Szczeszynski et al. | |
| 2023/0142335 | A1 | 5/2023 | Szczeszynski et al. | |
| 2023/0148059 | A1 | 5/2023 | Szczeszynski | |
| 2023/0231433 | A1 * | 7/2023 | Mao | H02K 19/32 310/268 |

OTHER PUBLICATIONS

Szczeszynski, Gregory, "Protecting Multi-Level Power Converters", patent application filed in the USPTO on Dec. 23, 2021, U.S. Appl. No. 17/560,700, 50 pgs.

Szczeszynski, Gregory, "Improving Light-Load Recovery in a Multi-Level Converter", patent application filed in the USPTO on Dec. 23, 2021, U.S. Appl. No. 17/560,683, 52 pgs.

Zweizig, Jefferey Shawn, Office Action received from the USPTO dated Oct. 14, 2022 for U.S. Appl. No. 17/559,931, 11 pgs. ).

Wu, Gary, "Efficient Bootstrap Supply Generators for Multi-Level Power Converters", U.S. Patent application filed in the USPTO on Dec. 22, 2021 for U.S. Appl. No. 17/559,931, 67 pgs.

Madouroglou, E., International Search Report and Written Opinion received from the EPO dated Sep. 19, 2022, 14 pgs.

Meynard, et al., "Multi-Level Conversion: High Voltage Choppers and Voltage-Source Inverters", Proceedings of the Annual Power Electronics Specialists Conference, Toledo, Jun. 29-Jul. 3, 1992; Proceedings of the Annual Power Electronics Specialists Conference, New York, IEEE, US, vol. 1, Jun. 29, 1992, pp. 397-403.

Peng, Fang Zheng, "A Generalized Multilevel Inverter Topology with Self Voltage Balancing", IEEE Transactions on Industry Applications, IEEE Service Center, vol. 37, No. 2, Mar. 1, 2001, pp. 611-618.

Chen, et al., "Zero-Voltage-Switching PWM Hybrid Full-Bridge Three-Level Converter", IEEE Transactions on Power Electronics, Institute of Electrical and Electronics Engineers, vol. 20, No. 2, Mar. 1, 2005, pp. 395-404.

(56) References Cited

OTHER PUBLICATIONS

Lin, et al., "Interleaved Resonant Converter with the Balanced Flying Capacitors", IET Power Electronics, IET, UK, vol. 8, No. 3, Mar. 1, 2015, pp. 447-457.

Zweizig, Jefferey Shawn, Notice of Allowance received from the USPTO dated Dec. 28, 2022 for U.S. Appl. No. 17/559,931, 7pgs. ).

Zou, et al., The Analysis of DC-DC Converter Topologies Based on Stackable Voltage Elements, The Ohio State University, IEEE 2010, pp. 4428-4433.

Jia, et al., "Active Power Decoupling for a Modified Modular Multilevel Converter to Decrease Submodule Capacitor Voltage Ripples and Power Losses", IEEE Transactions on Power Electronics, vol. 36, No. 3, Mar. 2021, pp. 2835-2851.

Yuan, et al., "Self-Balancing of the Clamping-Capacitor-Voltages in the Multilevel Capacitor-Clamping-Inverter under Sub-Harmonic PWM Modulation", IEEE Transactions on Power Electronics, vol. 16, No. 2, Mar. 2001, pp. 256-263.

Kruip, Stephan, International Search Report and Written Opinion received from the EPO dated Feb. 28, 2023 for appln. No. PCT/US2022/078920, 10 pgs.

Sepahvand, et al., "Start-Up Procedure and Switching Loss Reduction for a Single-Phase Flying Capacitor Active Rectifier", IEEE Transactions on Industrial Electronics, vol. 60, No. 9, Sep. 2013, pp. 3699-3710.

Kruip, Stephan, International Search Report and Written Opinion received from the EPO dated Feb. 27, 2023 for appln. No. PCT/US2022/078918, 9 pgs. (PER-370-PCT).

Da Rocha, et al., "Level Shifters and DCVSL for a Low-Voltage Cmos 4.2-V Buck Converter", IEEE Transactions on Industrial Electronics, vol. 55, No. 9, Sep. 2008, pp. 3315-3323.

Kellner, Alexandria, International Search Report and Written Opinion received from the EPO dated Feb. 2, 2023 for appln. No. PCT/US2022-078717, 12 pgs.

Tiku, Sisay G., Office Action received from the USPTO dated Jul. 7, 2023 for U.S. Appl. No. 17/560,700, 17 pgs.

Novak, Peter Michael, Office Action received from the USPTO dated Aug. 4, 2023 for U.S. Appl. No. 17/560,683, 18 pgs.

Nelson, Carl, Analog Circuit Design Stub from Chapter 5—LT1070 design manual. Editor(s): Bob Dobkin, Jim Williams. ISBN 9780123851857 (Year: 2011).

Novak, Peter Michael, Final Office Action received from the USPTO dated Jan. 22, 2024 for U.S. Appl. No. 17/560,683, 22 pgs.

\* cited by examiner

200

1200

1220

1240

MULTI-LEVEL STRUCTURES AND METHODS FOR SWITCHED-MODE POWER SUPPLIES

CROSS-REFERENCE TO RELATED APPLICATIONS—CLAIM OF PRIORITY

The present application claims priority to U.S. provisional Patent Application No. 63/214,474, filed on Jun. 24, 2021, for a "Multi-Level Structures and Methods for Switched-Mode Power Supplies", which is herein incorporated by reference in its entirety.

BACKGROUND

(1) Technical Field

This invention relates to electronic circuits, and more particularly to power converter circuits, including DC-DC power converter circuits.

(2) Background

Many electronic products, particularly mobile computing and/or communication products and components (e.g., cell phones, notebook computers, ultra-book computers, tablet devices, LCD and LED displays) require multiple voltage levels. For example, radio frequency (RF) transmitter power amplifiers may require relatively high voltages (e.g., 12V or more), whereas logic circuitry may require a low voltage level (e.g., 1-3V). Still other circuitry may require an intermediate voltage level (e.g., 5-10V).

Direct current power converters are often used to generate a lower or higher voltage from a common power source, such as batteries, solar cells, fuel cells, and rectified AC sources. Power converters which generate a lower output voltage level from a higher input voltage power source are commonly known as buck converters, so-called because the output voltage $V_{OUT}$ is less than the input voltage $V_{IN}$, and hence the converter is "bucking" the input voltage. Power converters which generate a higher output voltage level from a lower input voltage power source are commonly known as boost converters, because $V_{OUT}$ is greater than $V_{IN}$. Some power converters may be either a buck converter or a boost converter depending on which terminals are used for input and output. Some power converters may provide an inverted output.

It would be advantageous to develop converter cell topologies for power converters that exhibit reduced voltage ripple, enable use of lower power and smaller switches, provide improved power density and efficiency, and provide for improved input/output voltage dynamic range.

SUMMARY

The present invention encompasses modified converter cells for switched-mode power converters that exhibit reduced inductance requirements, enable use of lower voltage and smaller switches, provide improved power density and efficiency, and provide for improved input/output voltage dynamic range. The present invention further encompasses methods for generating converter cell topologies including three or more node voltage levels by successively applying a "split switches and connect through a capacitor" operation that may start with a 2-level converter cell.

The inventive processes, or variants of those processes, may be applied to converter cell topologies that are 2-level converter cells including at least one inductance and two switches. A useful subset of such 2-level converter cells includes either (1) an order of at least 3 designed-in energy storage elements (i.e., 3 or more energy storage elements in some combination of designed-in inductances and/or capacitances, but including at least one inductance) and at least 2 switches, or (2) at least one inductance and at least 4 switches. Such 2-level converter cells may include a transformer or coupled inductors.

One embodiment of the invention encompasses a method for modifying a 2-level converter cell including at least one inductance and two switches, the method including: replacing any diode switches within the 2-level converter cell with single-pole, single-throw switches; selecting a pair of switches within the 2-level converter cell that are not conductive at the same time during steady-state operation; splitting each of the two selected switches into 2 series-connected switches, thereby forming an intermediate node between the 2 series-connected selected switches; and connecting the newly formed in-between nodes through a capacitor. In some embodiments, splitting each of the two selected switches into 2 series-connected switches includes retaining each of the two selected switches and coupling each of the two selected switches in series with a respective added switch.

The details of one or more embodiments of the invention are set forth in the accompanying drawings and the description below. Other features, objects, and advantages of the invention will be apparent from the description and drawings, and from the claims.

DESCRIPTION OF THE DRAWINGS

Like reference numbers and designations in the various drawings indicate like elements.

DETAILED DESCRIPTION

The present invention encompasses modified converter cells for switched-mode power converters that exhibit reduced inductance requirements (due to lower voltages presented to inductor terminals), enable use of lower voltage and smaller switches, provide improved power density and efficiency, and provide for improved input/output voltage dynamic range. The present invention further encompasses methods for generating converter cell topologies having three or more node voltage levels by successively applying a "split switches and connect through a capacitor" operation that may start with a 2-level converter cell.

Switched-Mode Power Converters

Figure 1:
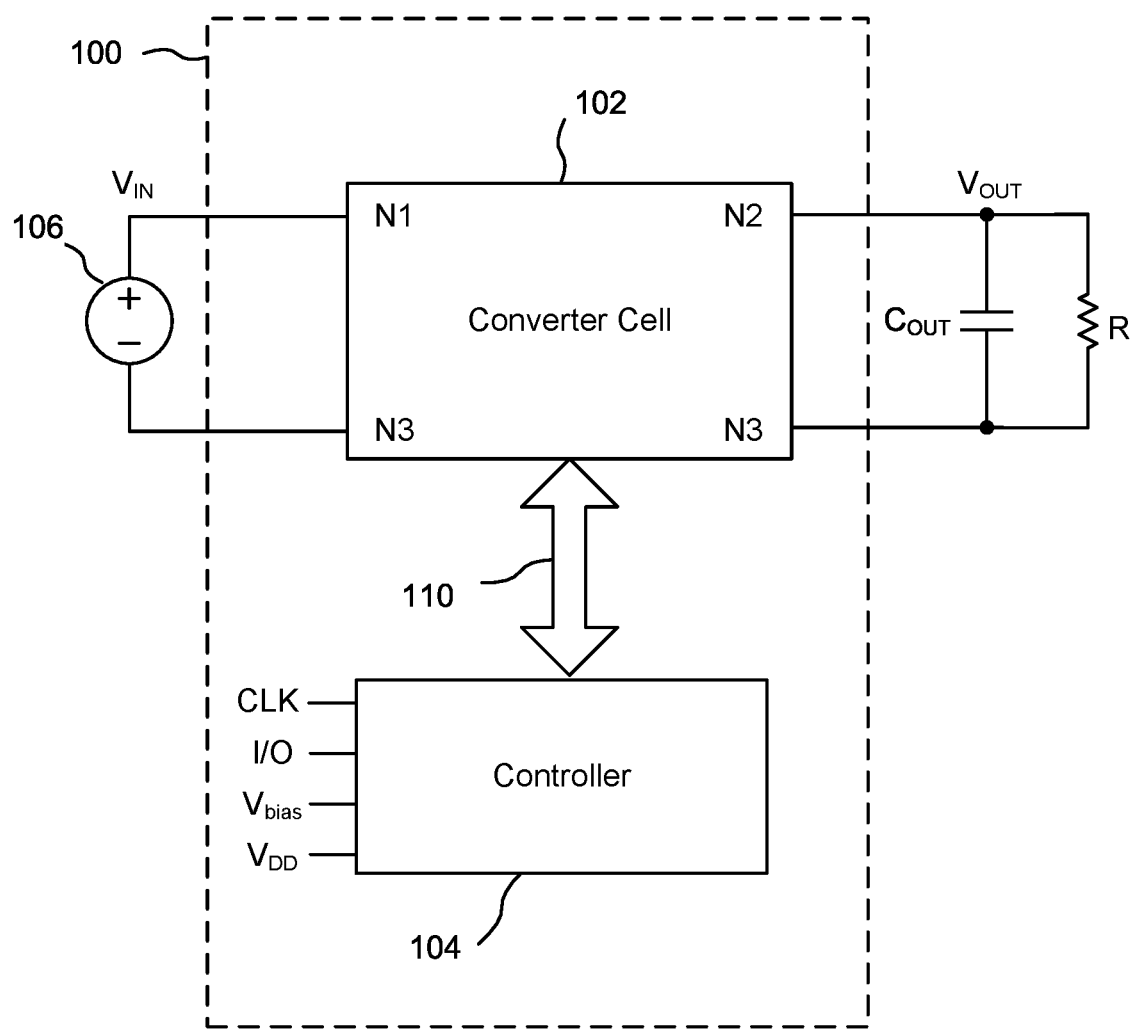
FIG. 1 is a block diagram of a circuit that includes a prior art power converter.

FIG. 1 is a block diagram of a circuit that includes a prior art power converter 100. In the illustrated example, the power converter 100 includes a converter cell 102 and a controller 104. The converter cell 102 is configured to receive an input voltage $V_{IN}$ from a voltage source 106 (e.g., a battery) across terminals N1, N3 (common), and transform the input voltage $V_{IN}$ into an output voltage $V_{OUT}$ across terminals N2, N3 (common). The output voltage $V_{OUT}$ is generally coupled across an output capacitor $C_{OUT}$, across which may be connected a load represented as an equivalent resistance R. In some embodiments of the power converter 100, auxiliary circuitry (not shown), such as a bias voltage generator(s), a clock generator, a voltage control circuit, etc., may also be present and coupled to the converter cell 102 and the controller 104.

The controller 104 receives a set of input signals and produces a set of output signals. Some of these input signals arrive along a signal path 110 connected to the converter cell 102. Some input signals carry information indicative of the operational state of the converter cell 102. The controller 104 generally also receives at least a clock/timing signal CLK and one or more external input/output signals I/O that may be analog, digital (encoded or direct signal lines), or a combination of both. Based upon the received input signals, the controller 104 produces a set of control signals back to the converter cell 102 on the signal path 110 that control the internal components of the converter cell 102 (e.g., internal integrated or external discrete switches, such as FETs, especially MOSFETs) to cause the converter cell 102 to convert $V_{IN}$ to $V_{OUT}$.

Figure 2A:
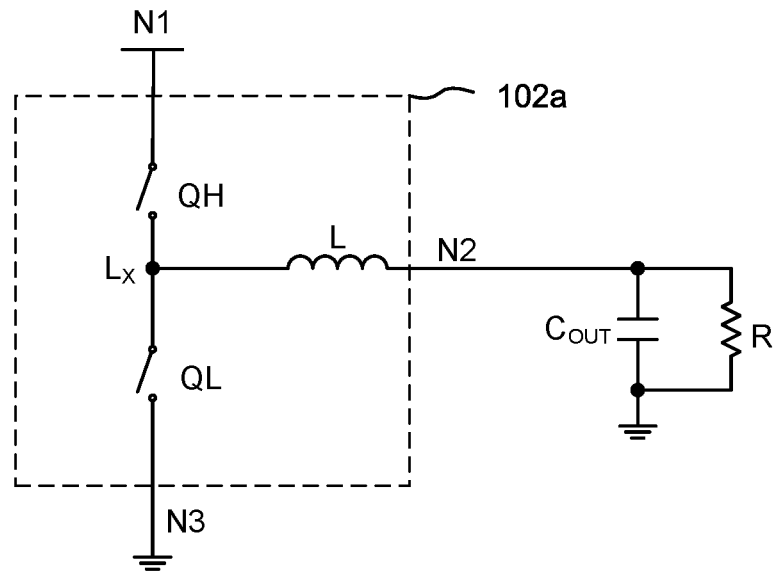
FIG. 2A is a schematic diagram of part of a prior art 2-level DC-to-DC buck converter circuit that includes a particular converter cell.

In some power converter designs, the converter cell 102 uses an inductor as an energy storage element. For example, FIG. 2A is a schematic diagram of part of a prior art 2-level DC-to-DC buck converter circuit 200 that includes a particular converter cell 102a. Within the converter cell 102a, a set of two switches QH, QL is series-coupled between $V_{IN}$ (applied at terminal N1) and a common reference voltage (e.g., circuit ground GND, coupled to terminal N3). An energy storage inductor L is coupled from a node $L_X$ between the set of switches QH, QL to an output capacitor $C_{OUT}$ which provides smoothing of high frequencies (e.g., switching frequency) and energy storage. The voltage across the output capacitor $C_{OUT}$ from terminal N2 is $V_{OUT}$ and is coupled to a load R.

One function of the inductor L and the output capacitor $C_{OUT}$ is energy transfer and storage. Part of the controller circuitry for the converter cell 102a generally includes a pulse-width modulation (PWM) duty cycle controller (not shown) coupled to control inputs of the switches QH, QL (e.g., the gates of MOSFETs) to alternately enable (close or turn "ON") and disable (open or turn "OFF") the switches QH, QL to control energy flow to the load R. The PWM duty cycle controller generally receives a clock or timing signal and $V_{OUT}$ as a feedback voltage. The feedback voltage enables the PWM duty cycle controller to vary the duty cycle of a PWM control signal to the switches QH, QL to offset changes in the load R, thereby regulating $V_{OUT}$.

Figure 2B:
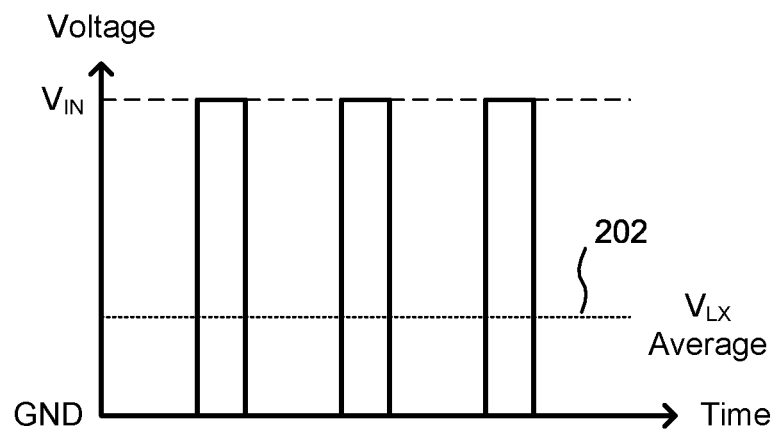
FIG. 2B is a graph showing the voltage level at node $L_X$ as a function of time for the circuit of FIG. 2A.

In the example shown in FIG. 2A, the converter cell 102a switches between two switch states: QH closed and QL open (voltage level at node $L_X=V_{IN}$), or QH open and QL closed (voltage level at node $L_X$=GND). FIG. 2B is a graph showing the voltage level at node $L_X$ as a function of time for the circuit of FIG. 2A. Graph line 202 is the average voltage level at node $L_X$ as switches QH and QL toggle between the two available switch states (i.e., QH closed and QL open for a charging state, or QH open and QL closed for a discharging state). The PWM duty cycle controller sets the duration in each switch state, which determines the amplitude of the average voltage at node $L_X$. Power converters 100 based on such converter cells 102 are also known as switched-mode power supplies (SMPS).

As can be appreciated by considering FIG. 2B, the inductor L sees large jumps in the voltage level at node $L_X$, from GND to $V_{IN}$ and back to GND. The resulting voltage (or voltage ripple) across the inductor L necessitates a significant amount of filtering to produce a smooth $V_{OUT}$, generally meaning that $C_{OUT}$ may have a large capacitance (usually requiring a large component). In addition, the switches QH and QL may need to withstand the full voltage range from $V_{IN}$ to GND, generally meaning that the switches QH, QL are physically large when implemented as FETs (e.g., because each switch comprises a long drift region or multiple FETs series-coupled—"stacked"—in order to withstand the full voltage range).

The voltage ripple across the inductor L and the voltage swing across any one switch can be reduced by adding more series switches and charge transfer capacitors as energy storage elements to transfer charge from $V_{IN}$ to $V_{OUT}$. Such charge transfer capacitors are commonly known as "fly capacitors" or "pump capacitors" and may be external components coupled to an integrated circuit embodiment of a converter circuit.

Figure 3A:
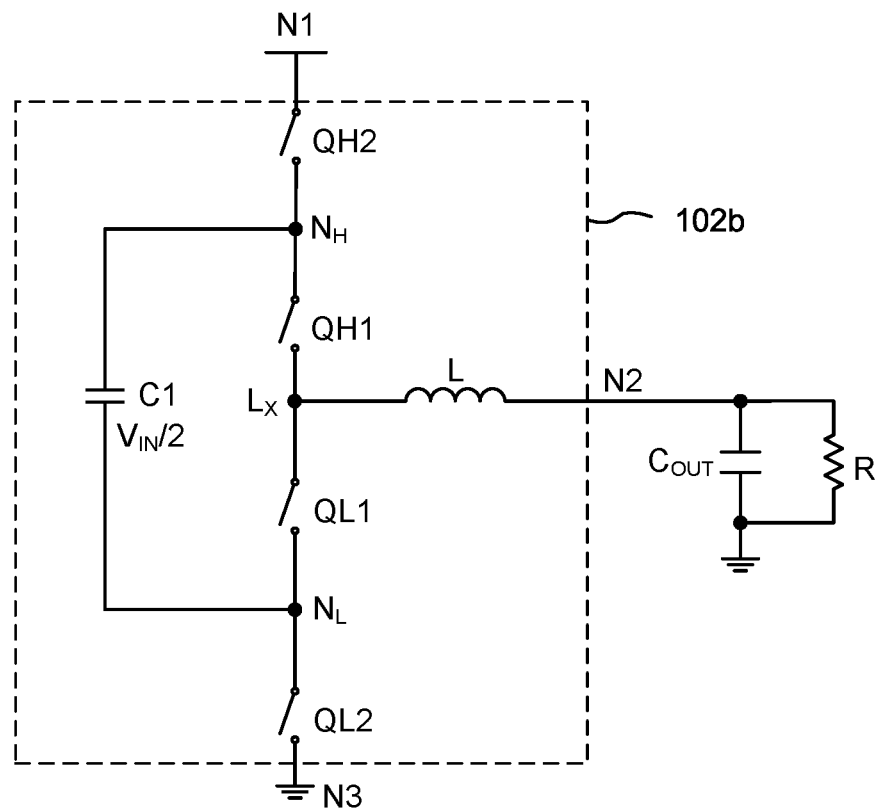
FIG. 3A is a schematic diagram of a part of a prior art 3-level DC-to-DC buck converter circuit that includes a particular converter cell.

For example, FIG. 3A is a schematic diagram of a part of a prior art 3-level DC-to-DC buck converter circuit 300 that includes a particular converter cell 102b. A set of four switches, QH2, QH1, QL1, QL2 is series-coupled between $V_{IN}$ (applied at terminal N1) and a common reference voltage (e.g., circuit ground GND, coupled to terminal N3). A fly capacitor C1 is coupled from a "high-side" node $N_H$ between switches QH2 and QH1 to a "low-side" node $N_L$ between switches QL1 and QL2. An energy storage inductor L is coupled from a node $L_X$ between the innermost set of switches QH1, QL1 to an output capacitor $C_{OUT}$. Again, the voltage across the output capacitor $C_{OUT}$ is $V_{OUT}$ at terminal N2.

In the illustrated example, the presence of the fly capacitor C1 in the converter circuit 200 enables four switch states that each generate one of three "node" voltage levels at node $L_X$, as set forth in TABLE 1 below.

TABLE 1

| Voltage Level | QH2 state | QH1 state | QL1 state | QL2 state | $L_X$ voltage |
|---|---|---|---|---|---|
| 1 | Open | Open | Closed | Closed | 0 V |
| 2 | Closed | Open | Closed | Open | $V_{IN}/2$ |
| 2 | Open | Closed | Open | Closed | $V_{IN}/2$ |
| 3 | Closed | Closed | Open | Open | $V_{IN}$ |

Figure 3B:
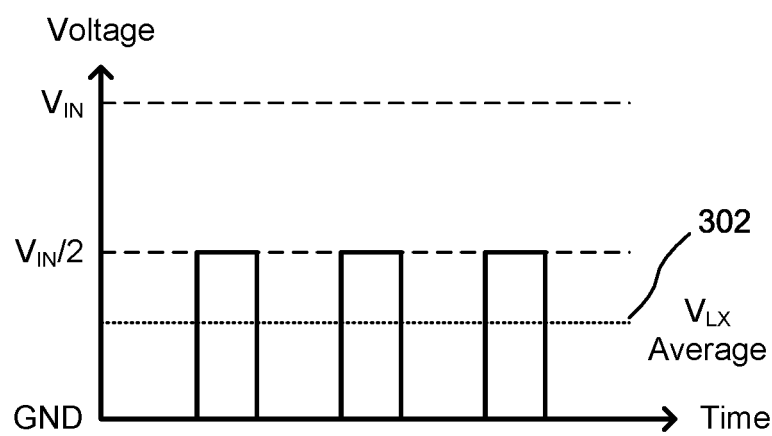
FIG. 3B is a graph showing the voltage level at node $L_X$ as a function of time for the circuit of FIG. 3A.

FIG. 3B is a graph showing the voltage level at node $L_X$ as a function of time for the circuit of FIG. 3A. Graph line 302 is the average voltage level at node $L_X$ as the switches cycle between GND and the two level-2 (i.e., $V_{IN}/2$) switch states and has the same value as graph line 202 in FIG. 2B. As can be appreciated by considering FIG. 3B, the inductor L sees much smaller jumps in the voltage level at node $L_X$, going from GND (Level-1) to only $V_{IN}/2$ (Level-2) and back to GND. The resulting reduced voltage ripple across the inductor L necessitates much less filtering to produce a $V_{OUT}$ with a small voltage ripple.

The topology of the converter cell 102b in FIG. 3A is commonly known as a "multi-level converter" (more specifically, a 3-level multi-level converter). However, many dozens of different types of converter cells topologies exist that could be used in a power converter similar to the one shown in FIG. 1.

It would be advantageous to use converter cell topologies in switched-mode power converters, but modified to exhibit reduced voltage ripple and/or inductance requirements, enable use of lower voltage and smaller switches, provide improved power density and efficiency, and provide for improved input/output voltage dynamic range.

Generalized Converter Cells

A converter cell may be defined as a topological combination of at least one designed-in (i.e., not parasitic) inductance or designed parasitic inductance, and at least one pair of complementary switches (which includes switch equivalents, such as diodes in some designs), arranged such that when an input voltage source and output voltage load are connected, the duty cycle controls the output voltage. There may also be times when the pair of complementary switches are both off at the same time (e.g., dead-time or non-overlap time). Converter cells that lack a transformer can be modeled as a 3-terminal device (input voltage source, output voltage load, and common) which may be connected in 3 or 6 different possible ways (depending on the symmetry of the converter cell) to an input voltage source, an output voltage load, and a common line to generate different converters while preserving the general power converter structure shown in FIG. 1. Converter cells that include an inductance in the form of a transformer may be modeled as a 4-terminal device with separate grounds, but the methods disclosed below still apply. A converter cell may include one or more designed-in internal or external capacitances coupled (or couplable, through a switch) to (1) two terminals of the converter cell and (2) in series with at least one designed-in inductance.

Figure 4:
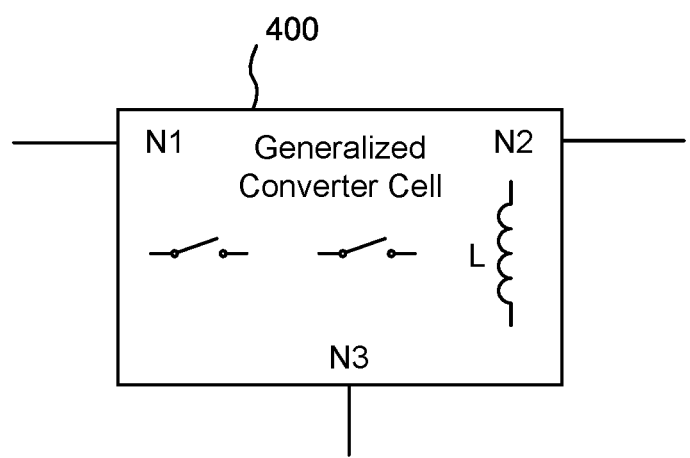
FIG. 4 is a symbolic representation of a 3-terminal converter cell.

FIG. 4 is a symbolic representation of a 3-terminal converter cell 400. Depending on connections, any of the terminals N1, N2, or N3 may be coupled to a source with an input voltage. One of the remaining terminals would be coupled to a load and output a corresponding conversion output voltage, and the last remaining terminal would be coupled to a common line. For example, N3 may be coupled to a common line (e.g., circuit ground), N1 may be coupled to an input voltage source V1, and N2 may be coupled to an output voltage load to which an output voltage V2 is to be supplied. If V2>V1, the converter cell 400 is in a boost configuration. If V2<V1, the converter cell 400 is in a buck configuration. By switching couplings for the terminals for some converter cell topologies, an inverting configuration may be available, or a buck-boost configuration may be available in which the duty cycle of the switches within the converter cell 400 determines whether the converter cell 400 is bucking or boosting a supplied input voltage. The terminals N1, N2, N3 may be coupled to an inductor L internal to the converter cell 400, either directly or through one or more switches and/or capacitors.

A key aspect of the converter cells that are the subject of the inventive method is that at least one pair of complementary switches intermittently couples an output terminal through an energy storage element of the converter cell to a first potential (ultimately from an input terminal) and to a second potential (ultimately from a common terminal)—that is, such converter cells are at least 2-level devices. The actual output voltage available to the designated output terminal is a function of the switch duty cycle set by control circuitry external to the converter cell.

The topology of a 2-level converter cell may also be classified according to its order, which indicates the number of energy storage elements (designed-in inductances and capacitances) used, and according to the number of single-pole, single-throw (SPST) switches used. For example, one tally of 2-level converter cells identifies 4 classes of converter cells, with each class comprising one or more "family members" and each family member including multiple variants of a basic converter cell circuit topology, as set forth in TABLE 2.

TABLE 2

| Order | No. of Switches | No. of Family Members |
|---|---|---|
| 1 | 2 | 1 |
| 1 | 4 | 1 |
| 3 | 2 | 5 |
| 3 | 4 | 7 |

It should be noted that this tally identifies basic converter cells and thus does not include minor variants that do not alter the fundamental behavior of an underlying basic converter cell. However, basic converter cells, variants of such converter cells, and more complex converter cells may be candidates for modification in accordance with the present invention so long as they are at least 2-level converter cells including at least one inductance and two complementary switches. A useful subset of 2-level converter cells includes either (1) an order of at least 3 designed-in energy storage elements (i.e., 3 or more energy storage elements in some combination of designed-in inductances and/or capacitances, but including at least one inductance) and at least 2 switches, or (2) at least one inductance and at least 4 switches. Such 2-level converter cells may include a transformer or coupled inductors.

General Method of Modifying 2-level Converter Cells to M-level Converter Cells

Figure 5A:
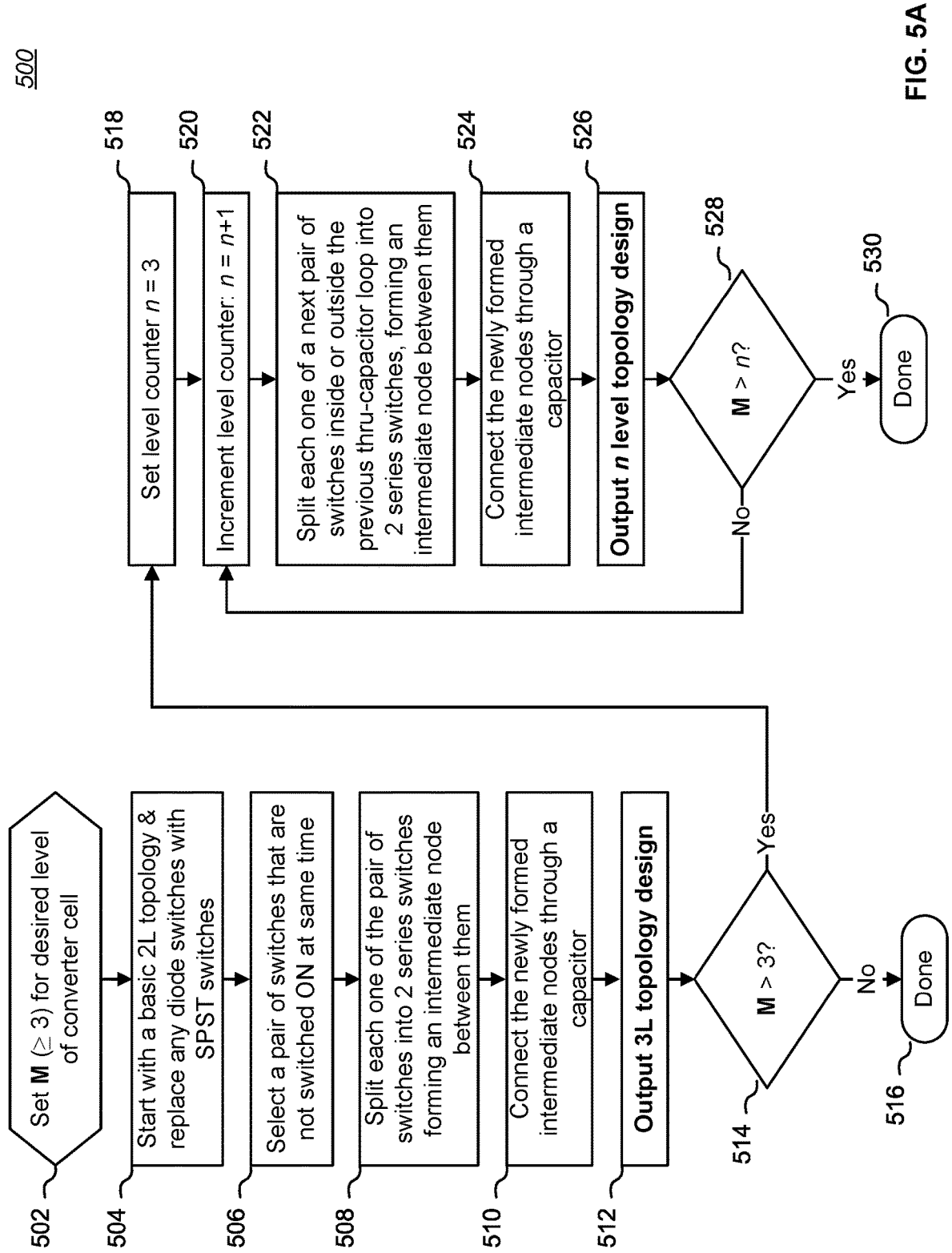
FIG. 5A is a process flowchart outlining a first method of modifying a selected 2-level converter cell to an M-level converter cell, where M≥3.

FIG. 5A is a process flowchart 500 outlining a first method of modifying a selected 2-level converter cell to an M-level converter cell, where M>3. The illustrated method includes the following steps, some of which may be performed in a different order.

Block 502: The value of M (the number of node voltages) is set (for example, by a circuit designer) to a value of 3 or more.

Block 504: Starting with the selected 2-level converter cell topology, each diode switch (if included in the 2-level converter cell topology) affecting the output of the converter cell is replaced with an SPST switch. Of course, if no diode switches are present in a converter cell topology, this step may be omitted.

Block 506: Select a pair of switches that are not switched ON (i.e., are not conductive and thus are OFF) at the same time during steady-state operation such that a short to ground may be created. In addition, the selected pair of switches should enable the converter cell to provide a useful level of DC-DC power conversion. This step accommodates 2-level converter cell designs that initially may have more than two switches (e.g., a Forward converter). If multiple pairs of such switches are available, then any pair can be selected.

Block 508: "Split" each of the two selected switches into 2 series-connected switches, thereby forming an intermediate node between each pair of the 2 series-connected switches. Conceptually, "split" means both selected switches are replaced by a respective pair of series-coupled switches. In practice, the original switches (after replacing each pertinent diode switch with an SPST switch) may simply be relabeled and then two new switches would be series-coupled to the relabeled switches to form a pair of series-coupled switches.

Block 510: Connect the newly formed intermediate nodes through a capacitor. The added switches and capacitor add another node voltage level to the converter cell.

Block 512: The completed 3-level topology design can be output at this point. For some applications, a 3-level topology may provide sufficient benefits compared to a 2-level topology that the process may be considered done.

Block 514: Test whether M is greater than 3.

Block 516: If M is not greater than 3, then the process is done.

Block 518: If M is greater than 3, then set a level counter n=3.

Block 520: Increment the level counter n=n+1.

Block 522: "Split" each one of a next pair of switches inside or outside the previous through-capacitor loop into 2 series-connected switches, thereby forming an intermediate node between each pair of the 2 series-connected switches. Note that there is no requirement at this point to use only inside or only outside switches to split—a mix may be used. For example, if a 3-level topology is generated by splitting the inner switches of a 2-level topology, then a 4-level topology may be generated by splitting the outer switches of the generated 3-level topology.

Block 524: Connect the newly formed intermediate nodes through a capacitor. The added switches and capacitor add another node voltage level to the converter cell.

Block 526: The completed n-level topology design can be output at this point.

Block 528: Test whether M is greater than n; if not, loop to Block 520.

Block 530: If M is greater than n, then the process is done.

Figure 5B:
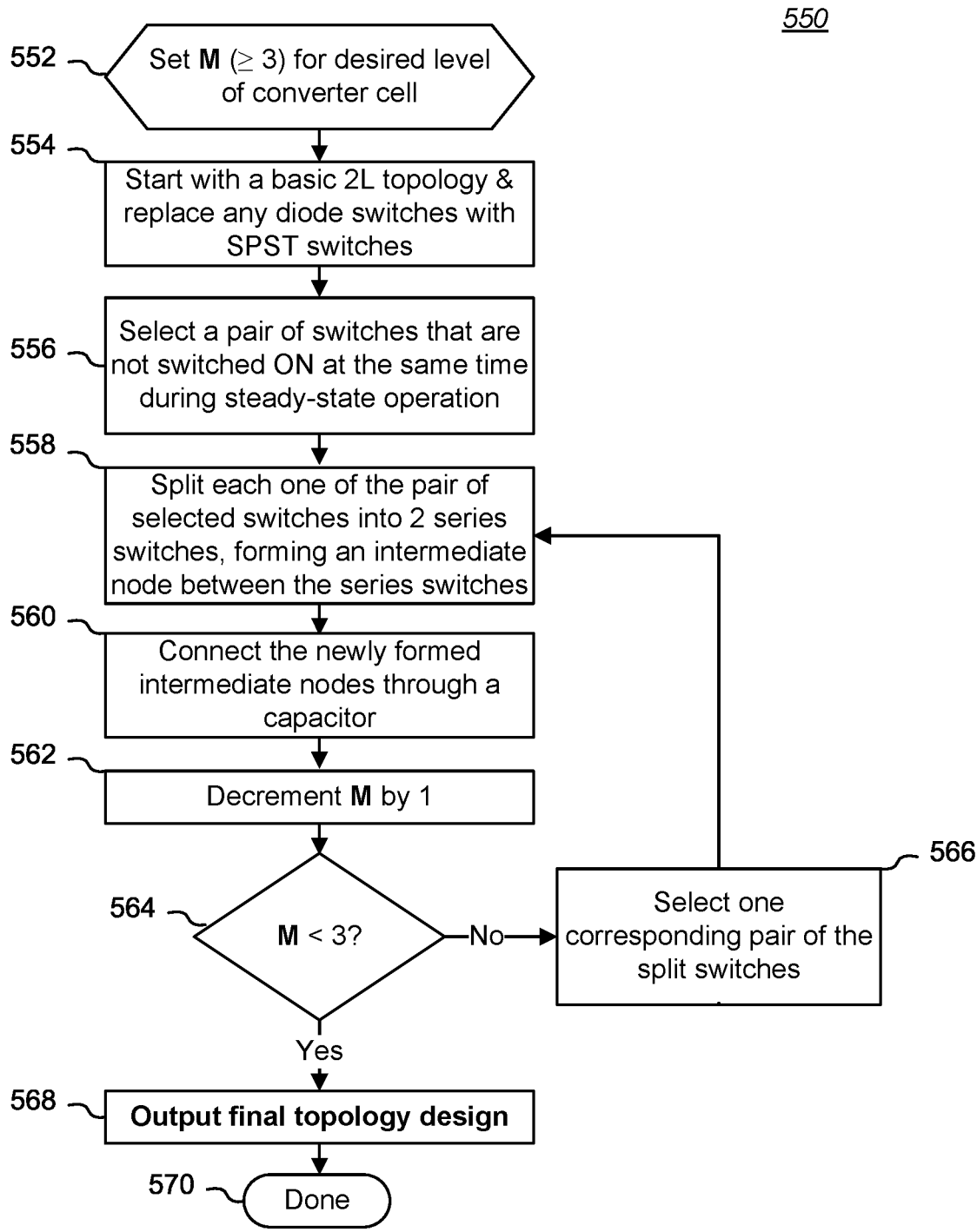
FIG. 5B is a process flowchart outlining a second method of modifying a selected 2-level converter cell to an M-level converter cell, where M≥3.

Variations of the above process may be used to the same effect. For example, FIG. 5B is a process flowchart 550 outlining a second method of modifying a selected 2-level converter cell to an M-level converter cell, where M>3. The illustrated method includes the following steps, some of which may be performed in a different order.

Block 552: The value of M (the number of node voltages) is set (for example, by a circuit designer) to a value of 3 or more.

Block 554: Starting with the selected 2-level converter cell topology, each diode switch (if included in the 2-level converter cell topology) affecting the output of the converter cell is replaced with an SPST switch. Of course, if no diode switches are present in a converter cell topology, this step may be omitted.

Block 556: Select a pair of switches that are not switched ON (i.e., are not conductive and thus are OFF) at the same time during steady-state operation such that a short to ground may be created. In addition, the selected pair of switches should enable the converter cell to provide a useful level of DC-DC power conversion. This step accommodates 2-level converter cell designs that initially may have more than two switches (e.g., a Forward converter).

Block 558: "Split" each of the two selected switches into 2 series switches, thereby forming an intermediate node between each pair of the 2 series switches.

Block 560: Connect the newly formed intermediate nodes through a capacitor. The added switches and capacitor add another node voltage level to the converter cell.

Block 562: Decrement M by 1.

Block 564: Test whether M is less than 3.

Block 566: If M is not less than 3, then select one corresponding pair of split switches (which may be the switches corresponding to the switches selected in Block 556) and loop to Block 558. Thus, for example, if a switch pair A and B is "split" into A1-A2 and B1-B2, then either A1 and B1 or A2 and B2 may be selected for further "splitting".

Block 568: If M is less than 3, then the final completed topology design can be output.

Block 570: The process is done.

Figure 5C:
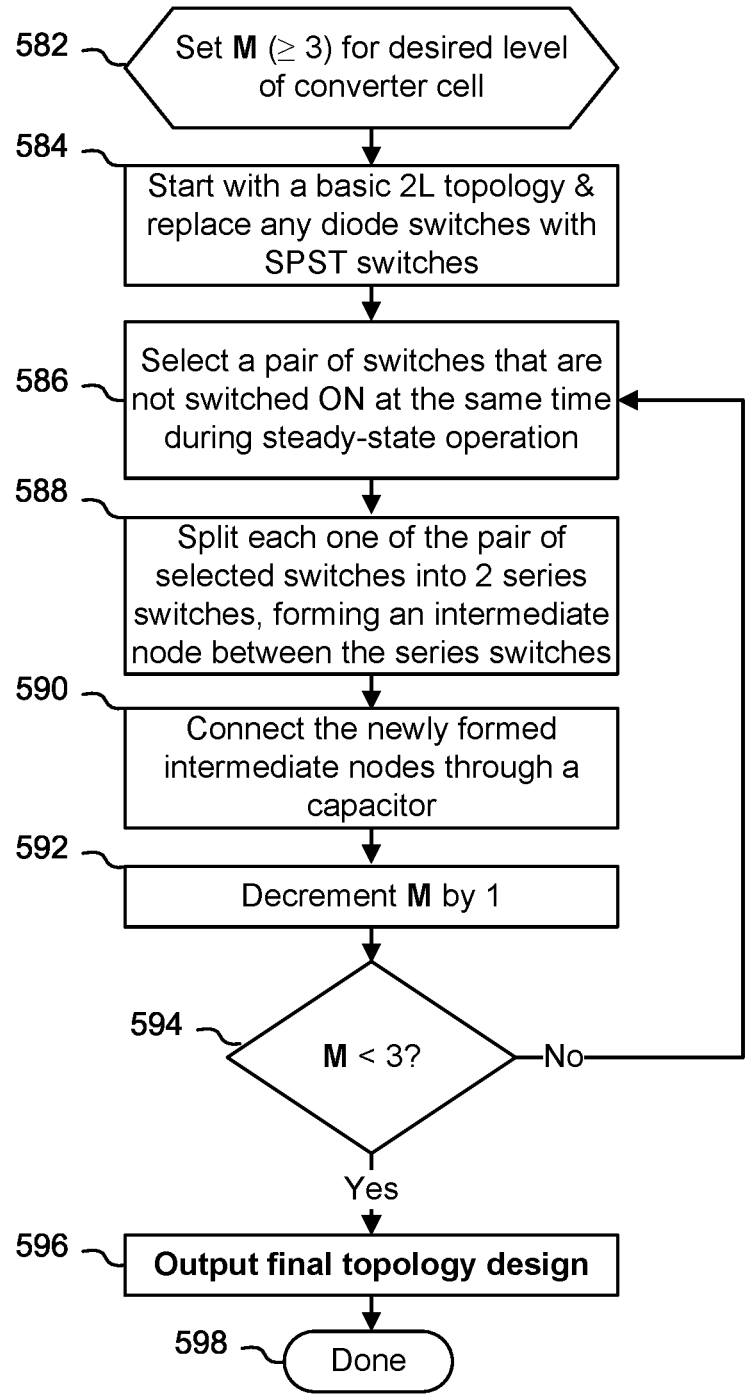
FIG. 5C is a process flowchart outlining a third method of modifying a selected 2-level converter cell to an M-level converter cell, where M≥3.

As another example of a variant of the process shown in FIG. 5A, FIG. 5C is a process flowchart 580 outlining a third method of modifying a selected 2-level converter cell to an M-level converter cell, where M>3. The illustrated method includes the following steps, some of which may be performed in a different order.

Block 582: The value of M (the number of node voltages) is set (for example, by a circuit designer) to a value of 3 or more.

Block 584: Starting with the selected 2-level converter cell topology, each diode switch (if included in the 2-level converter cell topology) affecting the output of the converter cell is replaced with an SPST switch. Of course, if no diode switches are present in a converter cell topology, this step may be omitted.

Block 586: Select a pair of switches that are not switched ON (i.e., are not conductive and thus are OFF) at the same time during steady-state operation such that a short to ground may be created. In addition, the selected pair of switches should enable the converter cell to provide a useful level of DC-DC power conversion. This step accommodates 2-level converter cell designs that initially may have more than two switches (e.g., a Forward converter).

Block 588: "Split" each of the two selected switches into 2 series switches, thereby forming an intermediate node between each pair of the 2 series switches.

Block 590: Connect the newly formed intermediate nodes through a capacitor. The added switches and capacitor add another node voltage level to the converter cell.

Block 592: Decrement M by 1.

Block 594: Test whether M is less than 3, and if M is not less than 3, then loop to Block 586.

Block 596: If M is less than 3, then the final completed topology design can be output.

Block 598: The process is done.

As should be clear, other variations of the above processes may be used to the same effect. For example, either process may start with a converter cell topology having a higher level than a 2-level converter cell (for instance, a 3-level converter cell).

Below are examples of the application of the above processes to a variety of 2-level converter cells including at least one designed-in inductance and at least one pair of complementary switches (which includes switch equivalents, such as diodes in some designs). A useful subset of such 2-level converter cells includes either (1) an order of at least 3 designed-in energy storage elements (i.e., 3 or more energy storage elements in some combination of designed-in inductances and/or capacitances, but including at least one inductance) and at least 2 switches, or (2) at least one inductance and at least 4 switches. Such 2-level converter cells may include a transformer or coupled inductors.

Non-Isolated Ćuk Converter Cell Embodiments

Figure 6:
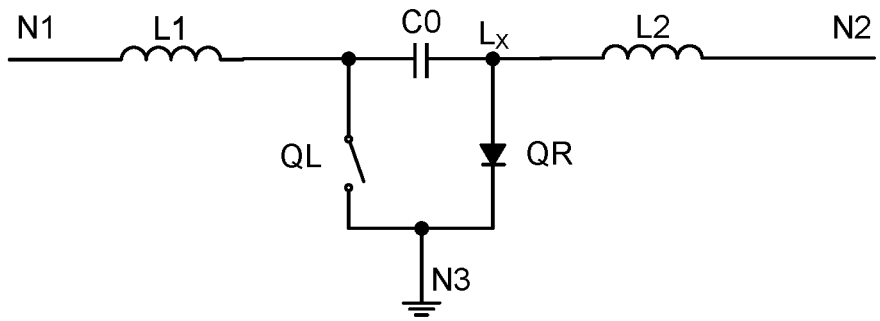
FIG. 6 is a schematic diagram of a prior art 2-level non-isolated Ćuk converter cell.

FIG. 6 is a schematic diagram of a prior art 2-level non-isolated Ćuk converter cell 600. In the illustrated example, the converter cell 600 includes a first inductor L1 series-coupled to a capacitor C0, which in turn is series-coupled to a second inductor L2. A voltage to be converted may be applied to terminal N1, with the converted output available at terminal N2. A first switch QL is coupled from a node between L1 and C0 to terminal N3 (in the illustrated example, terminal N3 is coupled to a reference potential such as circuit ground). A second switch QR, in the form of a diode, is coupled from a node between C0 and L2 to terminal N3. In alternative embodiments, QR may be replaced by a switch like QL.

As is known in the art, the main advantage of a non-isolated Ćuk converter cell is the continuous currents at the input and output of the converter cell. The main disadvantage is the high current stress on the switch QL.

Figure 7A:
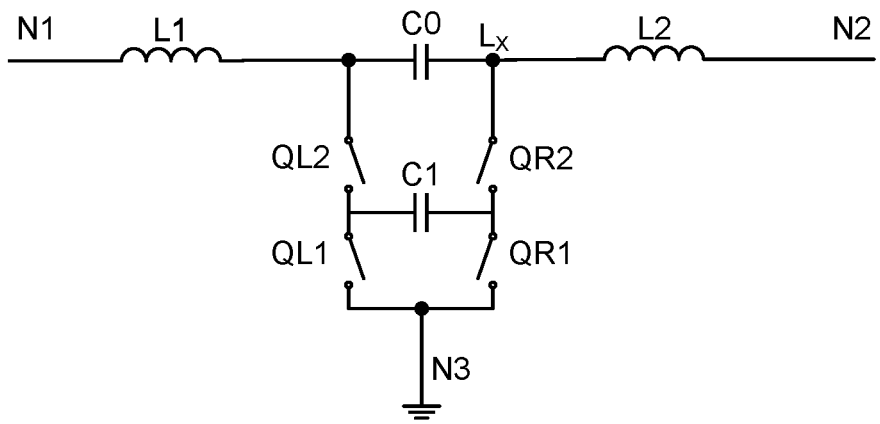
FIG. 7A is a schematic diagram of a novel 3-level non-isolated Ćuk converter cell.

The stress on the switch QL can be mitigated and the size of some of the components reduced by modifying the topology of the circuit of FIG. 6 in accordance with methods like those described in FIGS. 5A-5C. FIG. 7A is a schematic diagram of a novel 3-level non-isolated Ćuk converter cell 700. Starting with the 2-level circuit of FIG. 6, the diode switch QR is replaced with a single-pole, single-throw (SPST) switch. Then both the QL and QR switches are "split" into two switches coupled in series, meaning that they are both "replaced" by a pair of respective series-coupled switches QL1, QL2 and QR1, QR2. Again, from another point of view, the original switches from FIG. 6 (after swapping the diode switch QR with an SPST switch) are relabeled "QL1" and "QR1" and two new switches, QL2 and QR2, are series-coupled to the relabeled switches. A capacitor C1 is then coupled from a node between QL1 and QL2 to a node between QR1 and QR2.

The resulting topology provides 3 voltage levels at node $L_X$ of the converter cell 700. As a consequence, the output voltage ripple of the converter cell 700 and the voltage swing across any one switch are reduced (assuming the same passive components). The reduced switch voltage swing allows the use of smaller switches to a significant degree. For example, the 3-level converter cell of FIG. 7A may be reduced in size by a factor of 2× to 4× relative to the 2-level converter cell of FIG. 6. Such a reduction in size generally also means a reduction in power consumption for switching.

Both reduced physical size and better power efficiency are especially important for implementing power conversion solutions in applications such as battery-powered portable electronic devices (e.g., mobile cell phones).

Figure 7B:
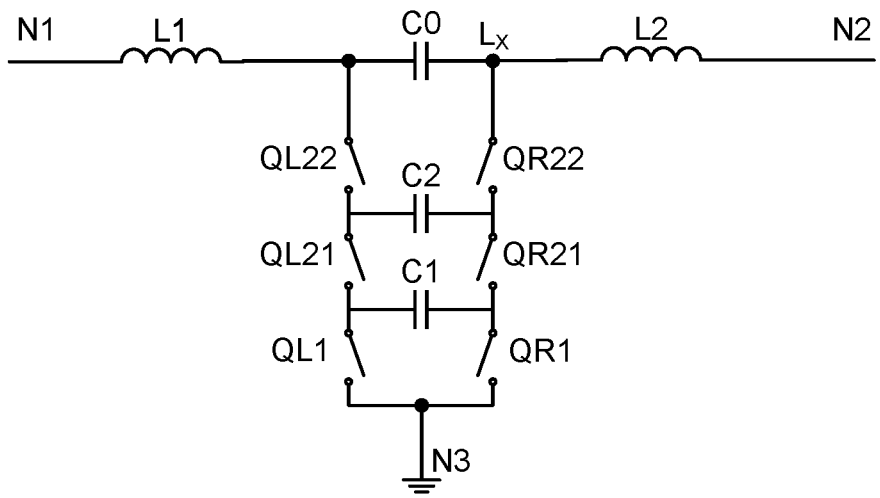
FIG. 7B is a schematic diagram of a novel 4-level non-isolated Ćuk converter cell.

The method applied with respect to the non-isolated Ćuk converter cell 700 of FIG. 7A can be iteratively applied to generate topologies having more than 3 node voltages. For example, FIG. 7B is a schematic diagram of a novel 4-level non-isolated Ćuk converter cell 710. In terms of the method shown in FIG. 5A, M is set to 4.

Since the 3-level modification is shown in FIG. 7A (that is, Blocks 502-512 were completed), the process can start with that circuit. Thus, starting with the 3-level circuit of FIG. 7A, the process continues at Block 518 of FIG. 5A. After setting and incrementing n, a corresponding pair of the "split" switches is selected (e.g., QL1 and QR1 for an "outer split", or QL2 and QR2 for an "inner split"). Each of the selected switches is "split" into two switches coupled in series (again, from another point of view, two new switches are series-coupled to a relabeled pair of existing switches). For example, in FIG. 7B, the "inner" pair of switches QL2 and QR2 are "split" into respective pairs of series-coupled switches QL21, QL22 and QR21, QR22. A capacitor C2 is then coupled from a node between QL21 and QL22 to a node between QR21 and QR22.

The resulting topology provides 4 voltage levels at node $L_X$ of the converter cell 710. As a consequence, the output voltage ripple of the converter cell 710 and the voltage swing across any one switch are further reduced compared to the 3-level converter cell 700 of FIG. 7A (assuming the same inductances and capacitances). The reduced switch voltage swing allows the use of even smaller switches to a significant degree. Additional topologies providing more than 4 node voltage levels can be generated by iteratively applying methods like those of FIG. 5A or 5B to the topology of FIG. 7B.

The voltage levels at node $L_X$ for the converter cells 700, 710 are achieved by switching the various switches of each topology such that terminal N2 is coupled through one or more pairs of switches to either terminal N1 or terminal N3.

Isolated Ćuk Converter Cell Embodiments

Figure 8:
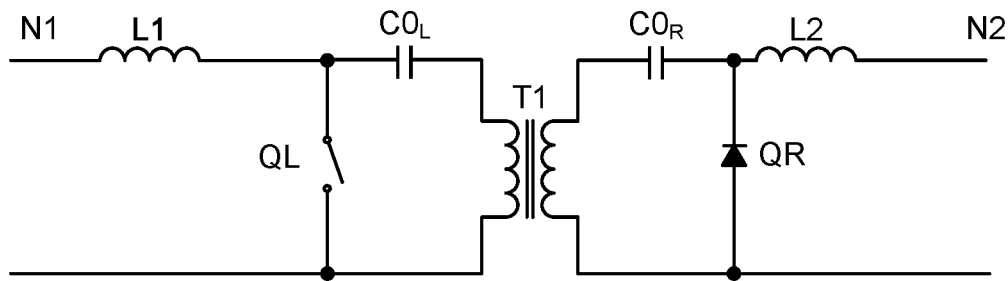
FIG. 8 is a schematic diagram of a prior art 2-level isolated Ćuk converter cell.

FIG. 8 is a schematic diagram of a prior art 2-level isolated Ćuk converter cell 800. In the illustrated example, the converter cell 800 includes a first inductor L1 series-coupled to a capacitor $C0_L$, which in turn is series-coupled to a first side of an isolation transformer T1 as shown. A first switch QL is coupled from a node between L1 and $C0_L$ to a first reference potential. The first side of the isolation transformer T1 is also coupled to the first reference potential, as shown. A voltage to be converted may be applied to terminal N1, with the converted output available at terminal N2. In the illustrated example, terminal N3 is coupled to a reference potential (e.g., circuit ground).

A second inductor L2 is series-coupled to a capacitor $C0_R$, which in turn is series-coupled to a second side of the isolation transformer T1 as shown. A second switch QR, in the form of a diode, is coupled from a node between $C0_R$ and L2 to a second reference potential. The second side of the isolation transformer T1 is also coupled to the second reference potential, as shown.

Figure 9A:
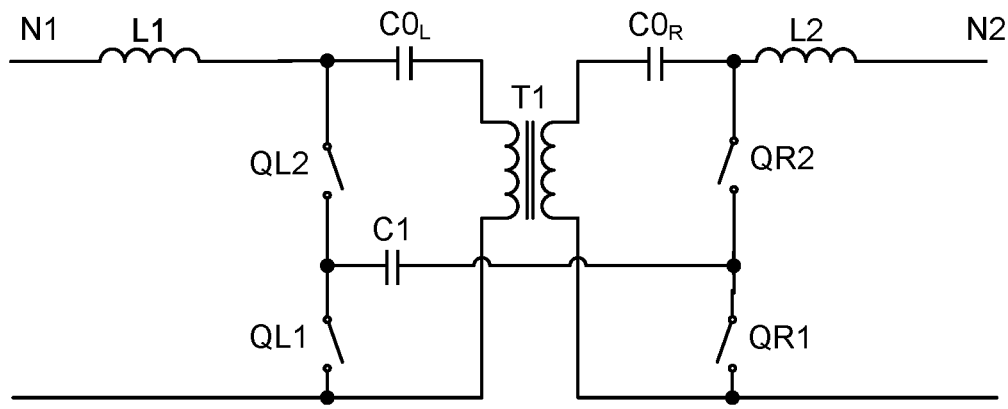
FIG. 9A is a schematic diagram of a novel 3-level isolated Ćuk converter cell.

FIG. 9A is a schematic diagram of a novel 3-level isolated Ćuk converter cell 900. The 3-level isolated Ćuk converter cell 900 has a topology generated by application of methods like those described in FIGS. 5A-5C. Starting with the 2-level circuit of FIG. 6, the diode switch QR is replaced with an SPST switch. Then both the QL and QR switches are "split" into two switches coupled in series, resulting in a pair of respective series-coupled switches QL1, QL2 and QR1, QR2. A capacitor C1 is then coupled from a node between QL1 and QL2 to a node between QR1 and QR2.

The resulting topology provides 3 internal voltage levels. As a consequence, the output voltage ripple of the converter cell 900 and the voltage swing across any one switch are reduced. Again, the reduced switch voltage swing allows the use of smaller switches to a significant degree.

Figure 9B:
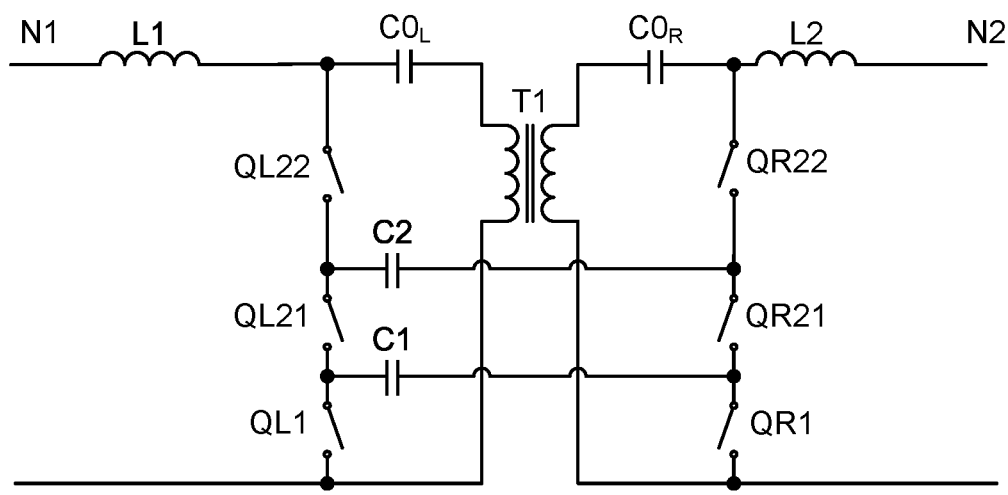
FIG. 9B is a schematic diagram of a novel 4-level isolated Ćuk converter cell.

The method applied with respect to the isolated Ćuk converter cell 900 of FIG. 9A can be iteratively applied to generate topologies having more than 4 node voltages. For example, FIG. 9B is a schematic diagram of a novel 4-level isolated Ćuk converter cell 910. Starting with the 3-level circuit of FIG. 9A, a corresponding pair of the "split" switches is selected (e.g., QL1 and QR1 for an "outer split", or QL2 and QR2 for an "inner split"). Each of the selected switches are then "split" into two switches coupled in series. For example, in FIG. 9B, the "inner" pair of switches QL2 and QR2 are "split" into respective pairs of series-coupled switches QL21, QL22 and QR21, QR22. A capacitor C2 is then coupled from a node between QL21 and QL22 to a node between QR21 and QR22.

The resulting topology provides 4 internal voltage levels. As a consequence, the output voltage ripple of the converter cell 910 and the voltage swing across any one switch are further reduced compared to the 3-level converter cell 900 of FIG. 9A. The reduced switch voltage swing allows the use of even smaller switches to a significant degree. Additional topologies providing more than 4 node voltage levels can be generated by iteratively applying methods like those of FIG. 5A or 5B to the topology of FIG. 9B.

Zeta/SEPIC Embodiments

Figure 10A:
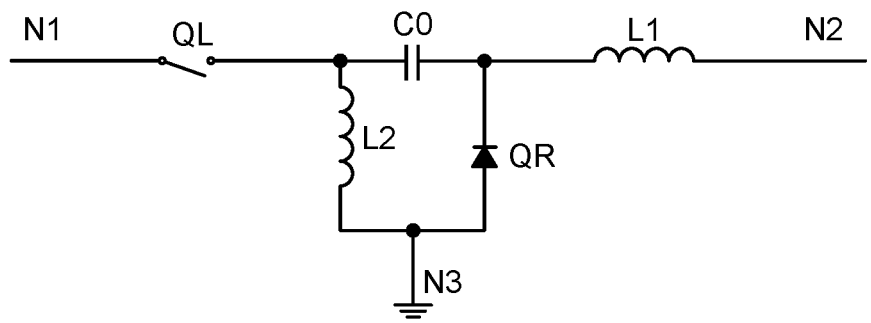
FIG. 10A is a schematic diagram of a prior art 2-level Zeta converter cell.

FIG. 10A is a schematic diagram of a prior art 2-level Zeta converter cell 1000. In the illustrated example, the converter cell 1000 includes a first switch QL series-coupled to a capacitor C0, which in turn is series-coupled to a first inductor L1. A voltage to be converted may be applied to terminal N1, with the converted output available at terminal N2. A second inductor L2 is coupled from a node between QL and C0 to terminal N3 (in the illustrated example, terminal N3 is coupled to a reference potential such as circuit ground). A second switch QR, in the form of a diode, is coupled from a node between C0 and L1 to terminal N3. In alternative embodiments, diode QR may be replaced by a switch like QL.

Figure 10B:
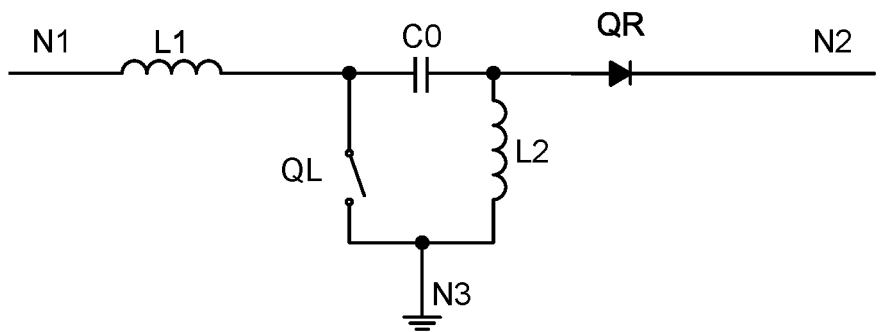
FIG. 10B is a schematic diagram of a prior art 2-level SEPIC converter cell.

FIG. 10B is a schematic diagram of a prior art 2-level SEPIC converter cell 1010. In the illustrated example, the SEPIC (standing for "single-ended primary-inductor converter") converter cell 1010 includes a first inductor L1 series-coupled to a capacitor C0, which in turn is series-coupled to a first switch QR, in the form of a diode. A voltage to be converted may be applied to terminal N1, with the converted output available at terminal N2. A second switch QL is coupled from a node between L1 and C0 to terminal N3 (in the illustrated example, terminal N3 is coupled to a reference potential such as circuit ground). A second inductor L2 is coupled from a node between C0 and QR to terminal N3. In alternative embodiments, diode QR may be replaced by a switch like QL.

The SEPIC converter cell 1010 is essentially a mirror or inverse version of the Zeta converter cell 1000, most readily seen conceptually by replacing the diode-based switches with SPST switches.

Figure 11A:
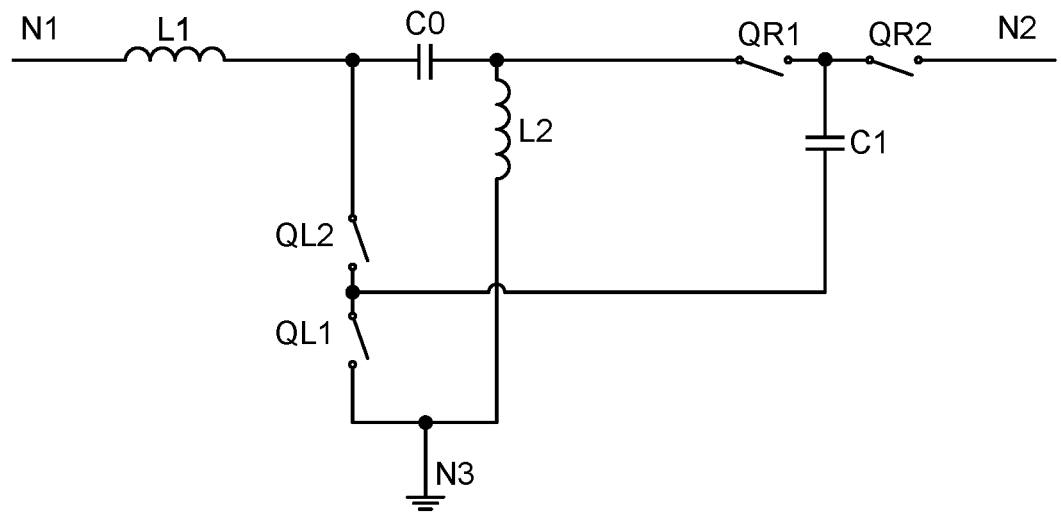
FIG. 11A is a schematic diagram of a novel 3-level Zeta/SEPIC converter cell.

FIG. 11A is a schematic diagram of a novel 3-level Zeta/SEPIC converter cell 1100. The 3-level Zeta/SEPIC converter cell 1100 has a topology generated by application of methods like those described in FIGS. 5A-5C. Starting with the 2-level circuit of FIG. 11A or 11B, the diode switch QR is replaced with an SPST switch. Then each of the QL and QR switches is "split" into two switches coupled in series and replaced by a pair of respective series-coupled switches QL1, QL2 and QR1, QR2. A capacitor C1 is then coupled from a node between QL1 and QL2 to a node between QR1 and QR2.

Figure 11B:
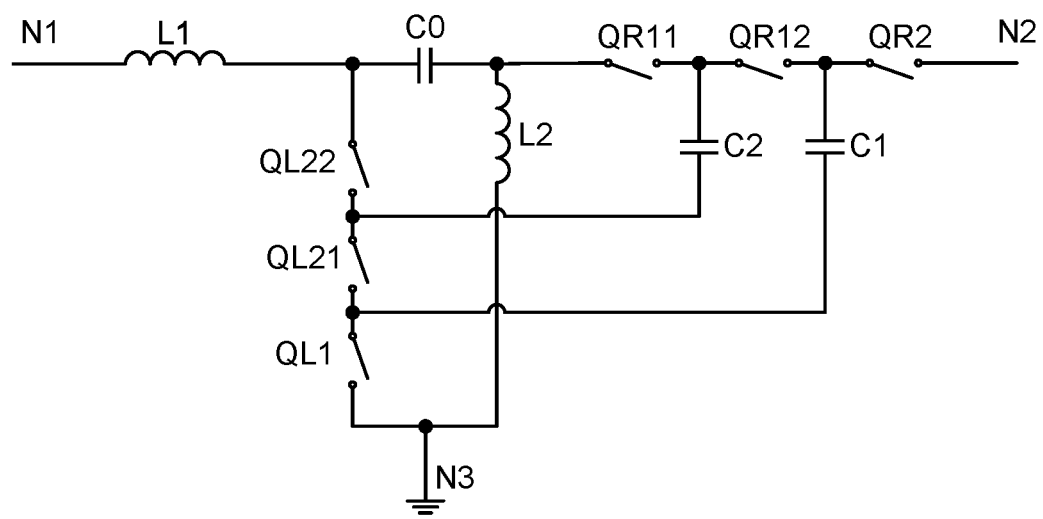
FIG. 11B is a schematic diagram of a novel 4-level Zeta/SEPIC converter cell.

FIG. 11B is a schematic diagram of a novel 4-level Zeta/SEPIC converter cell 1110. The 4-level Zeta/SEPIC converter cell 1110 has a topology generated by iterative application of methods like those described in FIGS. 5A-5C to the 3-level Zeta/SEPIC converter cell 1100 of FIG. 11A.

Additional topologies providing more than 4 node voltage levels can be generated by iteratively applying methods like those of FIG. 5A or 5B to the topology of FIG. 11B.

A notable feature of multi-level converter cell topologies like the 3-level Zeta/SEPIC converter cells 1100, 1110 shown in FIGS. 11A and 11B is that they may be selectively operated in a buck or boost mode by sequencing through selected settings of their switch states using suitable control circuitry. For example, for the 3-level Zeta/SEPIC converter cell 1100 shown in FIG. 11A, switch states may be defined within the associated control circuitry as set forth in TABLE 3.

TABLE 3

| Switch State | QL2 state | QL1 state | QR1 state | QR2 state |
|---|---|---|---|---|
| A | Closed | Open | Open | Closed |
| B | Open | Open | Closed | Closed |
| C | Closed | Closed | Open | Open |
| D | Open | Open | Open | Open |

These switch states may then be sequenced in particular orders to operate the Zeta/SEPIC converter cell 1100 in either a buck mode or a boost mode. In some cases, the switching duty cycle may be a factor in determining buck or boost mode. For example, TABLE 4 shows sequences involving either 3 or 4 of the switch states from TABLE 3 and the resulting mode of operation.

TABLE 4

| Sequence | Mode |
|---|---|
| CACB | Boost |
| CBCA | Boost |
| DADB | Buck |
| DBDA | Buck |
| CAB | Boost |
| DAB | Buck |

The concept of selectable buck or boost modes may be extended to higher-level Zeta/SEPIC converter cells, such as the 4-level Zeta/SEPIC converter cell 1110 shown in FIG. 11B.

Flyback Converter Cell Embodiments

Figure 12A:
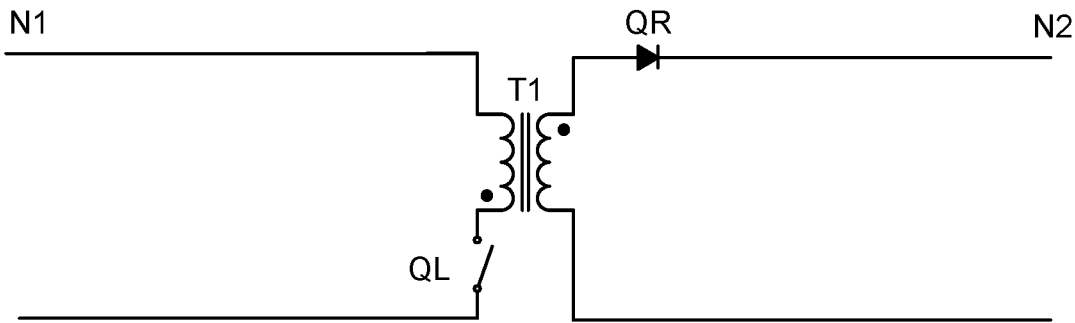
FIG. 12A is a schematic diagram of a prior art 2-level Flyback converter cell.

FIG. 12A is a schematic diagram of a prior art 2-level Flyback converter cell 1200. Also sometimes called a "Flycap" converter, terminal N1 is coupled to a first side of a transformer T1 as shown. A first switch QL is series-coupled between the first side of the transformer T1 and a first reference potential. A second switch QR, in the form of a diode, is series-coupled between a second side of the transformer T1 and terminal N2 as shown. The second side of the transformer T1 is also coupled to the second reference potential, as shown. In alternative embodiments, diode QR may be replaced by a switch like QL.

Figure 12B:
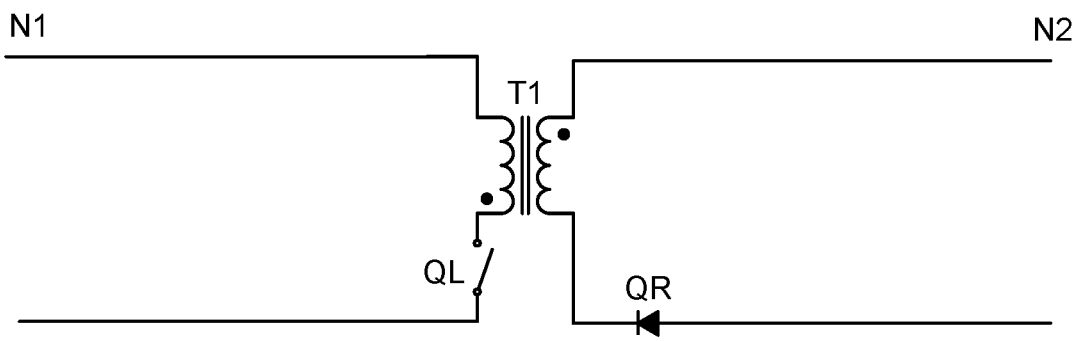
FIG. 12B is a schematic diagram of a variant prior art 2-level Flyback converter cell

FIG. 12B is a schematic diagram of a variant prior art 2-level Flyback converter cell 1220. In this embodiment, diode QR (or an equivalent switch) is coupled on the "bottom" leg of the second side of transformer T1, rather than the "top" leg as shown in FIG. 12A.

Figure 12C:
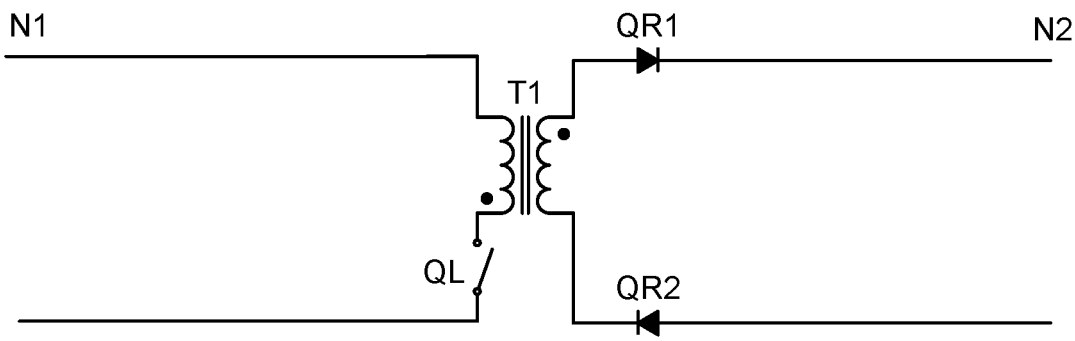
FIG. 12C is a schematic diagram of another variant 2-level Flyback converter cell.

FIG. 12C is a schematic diagram of another variant 2-level Flyback converter cell 1240. In this embodiment, diode QR1 (or an equivalent switch) is coupled on the "top" leg of the second side of transformer T1, as shown in FIG. 12A, and diode QR2 (or an equivalent switch) is coupled on "bottom" leg of the second side of transformer T1, as shown in FIG. 12B.

Figure 13A:
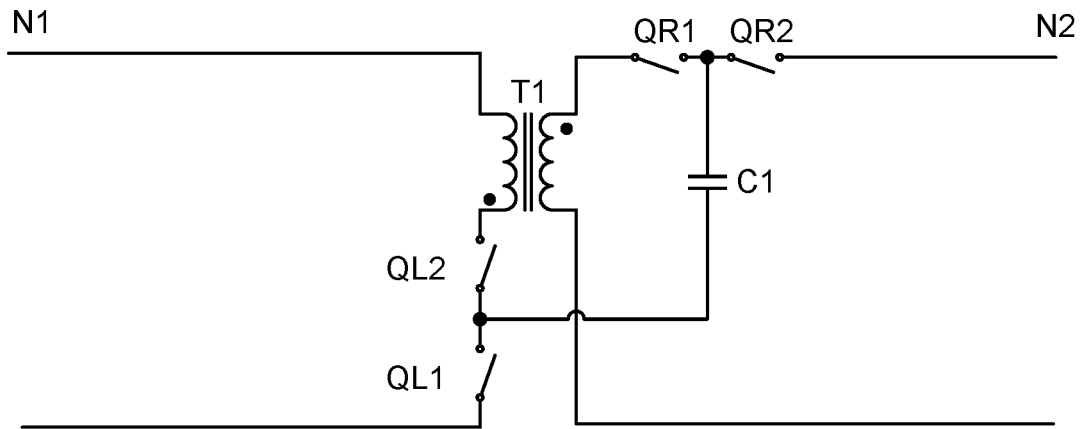
FIG. 13A is a schematic diagram of a novel 3-level Flyback converter cell having a topology generated from the circuit of FIG. 12A by application of methods like those described in FIGS. 5A-5C.

FIG. 13A is a schematic diagram of a novel 3-level Flyback converter cell 1300 having a topology generated from the circuit of FIG. 12A by application of methods like those described in FIGS. 5A-5C. Specifically, switch QL is "split" into switches QL1 and QL2, and switch QR is "split" into switches QR1 and QR2. A capacitor C1 is then coupled from a node between QL1 and QL2 to a node between QR1 and QR2. A similar process may be applied to the topology shown in FIG. 12B.

Figure 13B:
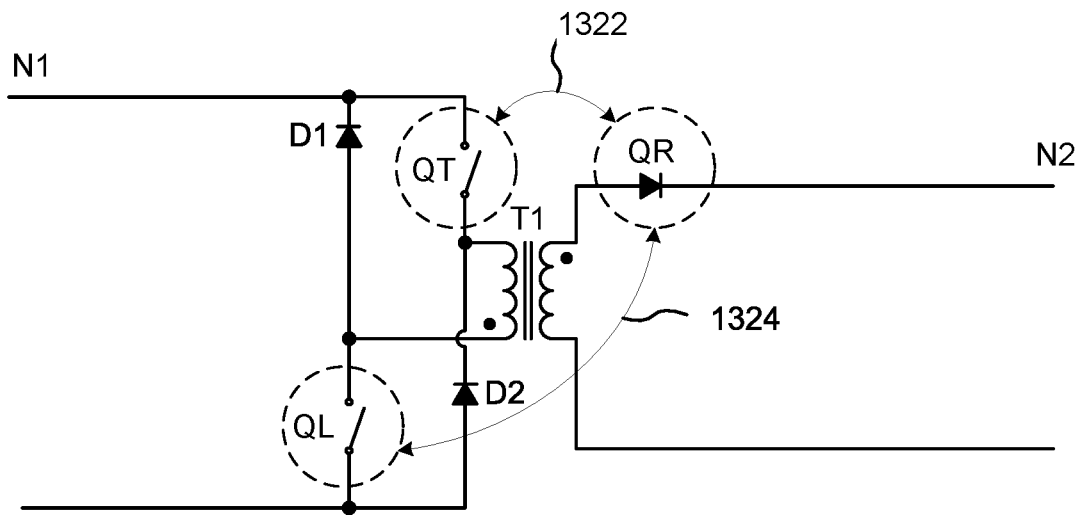
FIG. 13B is a schematic diagram of a two-switch Flyback converter cell.

FIG. 13B is a schematic diagram of a two-switch Flyback converter cell 1320. Adding to the topology shown in FIG. 12A, a switch QT is coupled between terminal N1 and a "top" terminal on the first side of the transformer T1, switch QL is also coupled to terminal N1 through a diode D1, and the reference potential is coupled to the "top" terminal on the first side of the transformer T1 through a diode D2. A similar addition of circuitry to the first side of the transformer T1 may be based on FIG. 12B or 12C. The example configuration in FIG. 13B shows circled associated pairs of switches (including a diode QR that would be converted to an SPST switch) that may each be split into new pairs of switches and coupled by a capacitor between newly formed inter-switch nodes in accordance with methods like those described in FIGS. 5A-5C. The circled associated pairs of switches are QT and QR (linked by line 1322), and QL and QR (linked by line 1324). A similar association process may be applied to the topologies shown in FIGS. 12B and 12C.

Figure 13C:
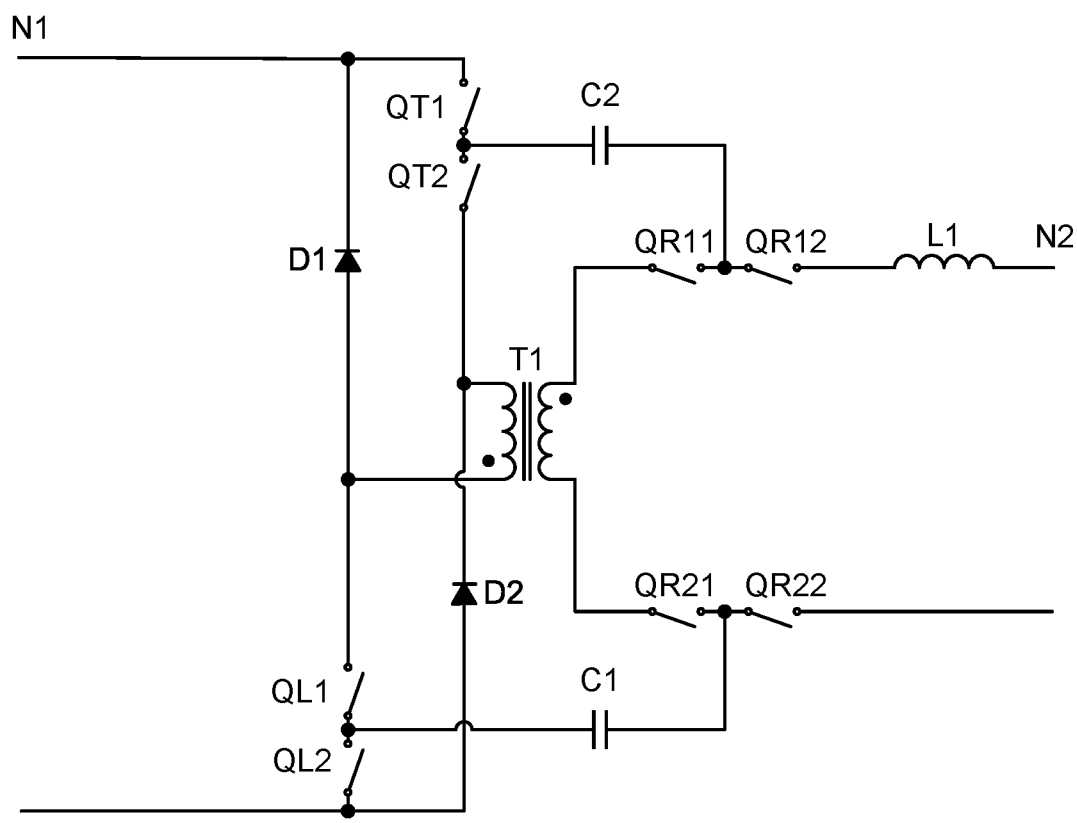
FIG. 13C is a schematic diagram of a two-switch Flyback converter cell based on FIG. 12C, shown after a 2-fold application of one of the methods of the present invention.

FIG. 13C is a schematic diagram of a two-switch Flyback converter cell 1340 based on FIG. 12C, shown after a 2-fold application of one of the methods of the present invention. A switch QT coupled between terminal N1 and a "top" terminal on the first side of the transformer T1 may be split into a pair of switches QT1 and QT2. The switch QL may be split into a pair of switches QL1 and QL2. The diode QR1 from FIG. 12C may be split into a pair of switches QR11 and QR12. Similarly, the diode QR1 from FIG. 12C may be split into a pair of switches QR21 and QR22. The illustrated example shows that a capacitor C1 may be coupled to the inter-switch nodes of switch pairs QL1-QL2 and QR21-QR22, and that a capacitor C2 may be coupled to the inter-switch nodes of switch pairs QT1-QT2 and QR11-QR12. As should be clear from this disclosure, other associations of split switch pairs may be intercoupled with a capacitor.

As in the example embodiments described above, methods like those described in FIGS. 5A-5C can be iteratively applied to generate Flyback converter cell topologies having more than 4 node voltages.

Forward Converter Cell Embodiments

Figure 14:
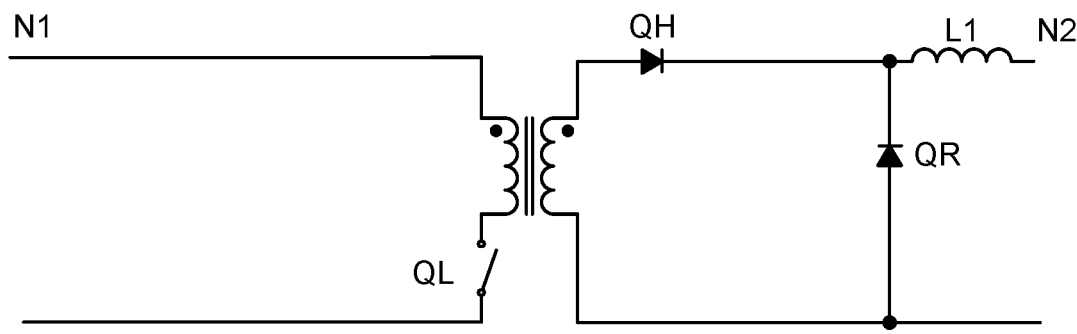
FIG. 14 is a schematic diagram of a prior art 2-level Forward converter cell.

FIG. 14 is a schematic diagram of a prior art 2-level Forward converter cell 1400. Terminal N1 is coupled to a first side of a transformer T1 as shown. A first switch QL is series-coupled between the first side of the transformer T1 and a first reference potential. A second switch QH, in the form of a diode, is series-coupled between a second side of the transformer T1 and an inductor L1, which in turn is series-coupled to terminal N2, as shown. A third switch QR, in the form of a diode, is coupled between terminal N2 and a second reference potential. The second side of the transformer T1 is also coupled to the second reference potential, as shown.

Figure 15A:
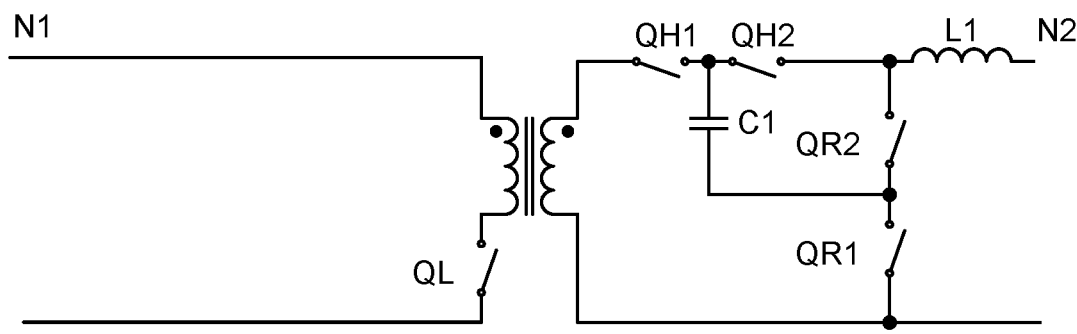
FIG. 15A is a schematic diagram of a novel 3-level Forward converter cell having a topology generated from the circuit of FIG. 14 by application of methods like those described in FIGS. 5A-5C.

FIG. 15A is a schematic diagram of a novel 3-level Forward converter cell 1500 having a topology generated from the circuit of FIG. 14 by application of methods like those described in FIGS. 5A-5C. One point to note with respect to FIG. 15A is that the 2-level Forward converter cell 1400 has 3 switches, QL, QH, and QR, that affect the output. However, by application of Block 506 of FIG. 5A ("Select a pair of switches that are not switched ON at same time" during steady-state operation), the switches selected for "splitting" are QH and QR. Accordingly, switch QH is "split" into switches QH1 and QH2, and switch QR is "split" into switches QR1 and QR2. A capacitor C1 is then coupled from a node between QH1 and QH2 to a node between QR1 and QR2.

In an alternative embodiment, the initial pair of selected switches to modify may be QL and QR. Accordingly, switch QL would be "split" into switches QL1 and QL2, and switch QR would be "split" into switches QR1 and QR2. A capacitor C1 is then coupled from a node between QL1 and QL2 to a node between QR1 and QR2.

Figure 15B:
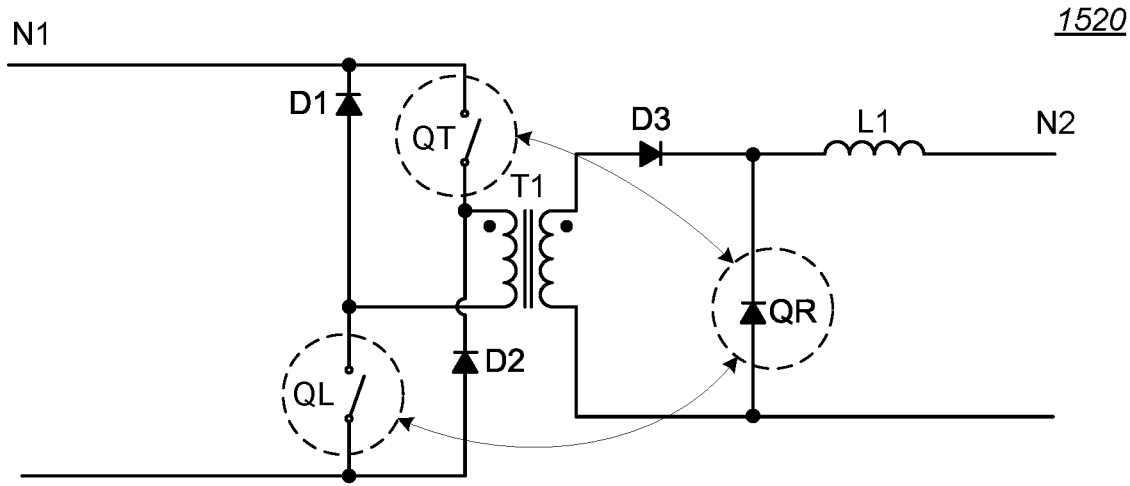
FIG. 15B is a schematic diagram of a two-switch Forward converter cell.

FIG. 15B is a schematic diagram of a two-switch Forward converter cell 1520. Adding to the topology shown in FIG. 14, a switch QT is coupled between terminal N1 and a "top" terminal on the first side of the transformer T1, switch QL is also coupled to terminal N1 through a diode D1, and the reference potential is coupled to the "top" terminal on the first side of the transformer T1 through a diode D2. The illustrated example shows circled associated pairs of switches (including a diode QR that would be converted to an SPST switch) that may each be split into new pairs of switches and coupled by a capacitor between newly formed inter-switch nodes in accordance with methods like those described in FIGS. 5A-5C. The circled associated pairs of switches are QT and QR, and QL and QR.

Figure 15C:
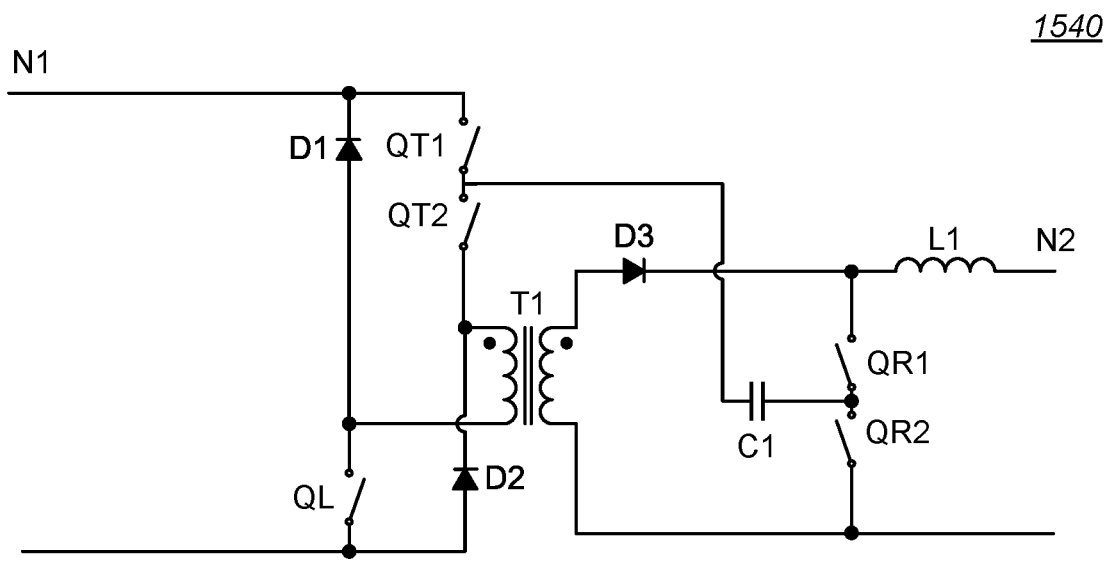
FIG. 15C is a schematic diagram of a 2-level two-switch Forward converter cell after conversion to a 3-level topology in accordance with methods like those described in FIGS. 5A-5C.

FIG. 15C is a schematic diagram of a 2-level two-switch Forward converter cell 1540 after conversion to a 3-level topology in accordance with methods like those described in FIGS. 5A-5C. In the illustrated example, switch QT and switch QR (after converting the diode to an SPST switch) have been split respectively into switch pairs QT1, QT2 and QR1, QR2 and their respective inter-switch nodes have been coupled by a capacitor C1.

As in the example embodiments described above, methods like those described in FIGS. 5A-5C can be iteratively applied to generate Forward converter cell topologies having more than 4 node voltages.

Four-Switch Buck-Boost Embodiments

Figure 16:
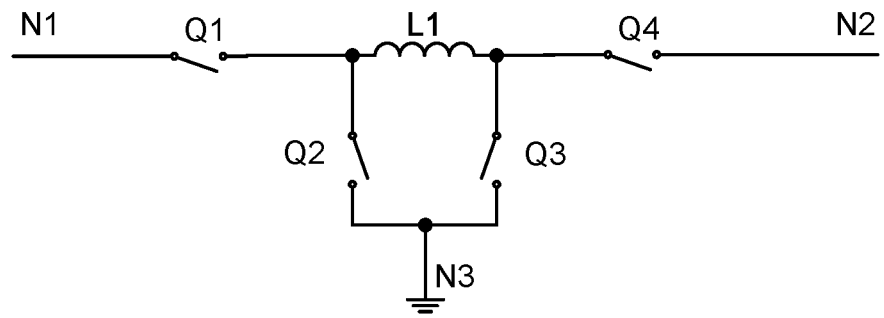
FIG. 16 is a schematic diagram of a prior art 2-level converter cell of order 1 using 4 switches.

Most of the converter cell embodiments described above have all been of at least order 3 (i.e., having 3 or more energy storage elements in some combination of designed-in inductances and capacitances, but including at least one inductance). The methods of the present invention may also be applied to converter cells of order 1 with at least 2 switches. For example, FIG. 16 is a schematic diagram of a prior art 2-level converter cell 1600 of order 1 using 4 switches. Such converter cells may also be called four-switch buck-boost converter cells.

In the illustrated example, the converter cell 1600 includes a first switch Q1 series-coupled to an inductor L1, which in turn is series-coupled to a second switch Q4. A voltage to be converted may be applied to terminal N1, with the converted output available at terminal N2. A third switch Q2 is coupled from a node between Q1 and L1 to terminal N3 (in the illustrated example, terminal N3 is coupled to a reference potential such as circuit ground). A fourth switch Q3 is coupled from a node between L1 and Q4 to terminal N3.

Figure 17:
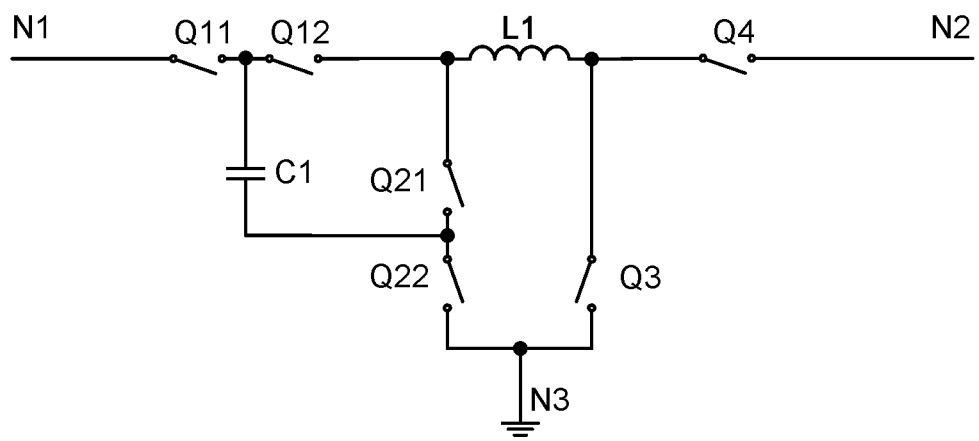
FIG. 17 is a schematic diagram of a novel 3-level converter cell having a topology generated from the circuit of FIG. 16 by application of methods like those described in FIGS. 5A-5C.

FIG. 17 is a schematic diagram of a novel 3-level converter cell 1700 having a topology generated from the circuit of FIG. 16 by application of methods like those described in FIGS. 5A-5C. In the illustrated example, Q1 is "split" into switches Q11 and Q12, and switch Q2 is "split" into switches Q21 and Q22. A capacitor C1 is then coupled from a node Q11 and Q12 to a node between Q21 and Q22.

Figure 18:
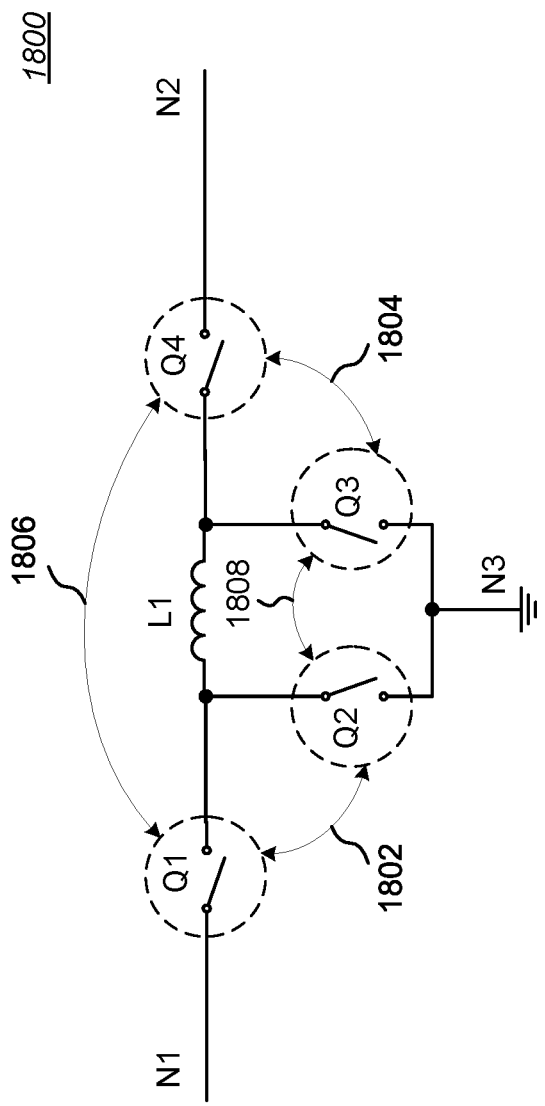
FIG. 18 is a schematic diagram of a 2-level converter cell of order 1 using 4 switches, showing circled associated pairs of switches that may each be split into new pairs of switches and coupled by a capacitor between nodes between the new pairs of switches.
Figure 19:
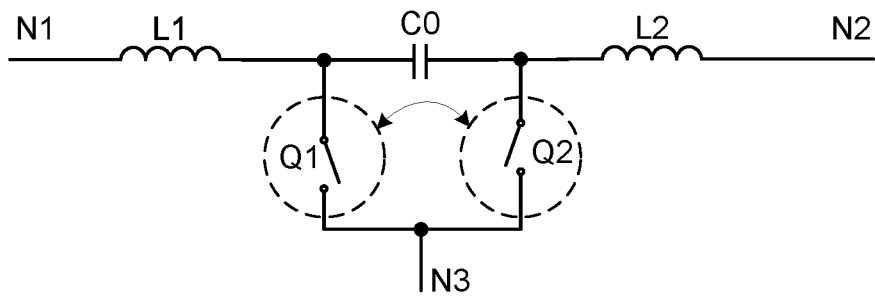
FIGS. 19-30 are schematic diagrams of a few examples of converter cell circuit topologies that may be transformed to higher level converter cells by applying the processes set forth in FIGS. 5A-5C, or variants of those processes.
Figure 20:
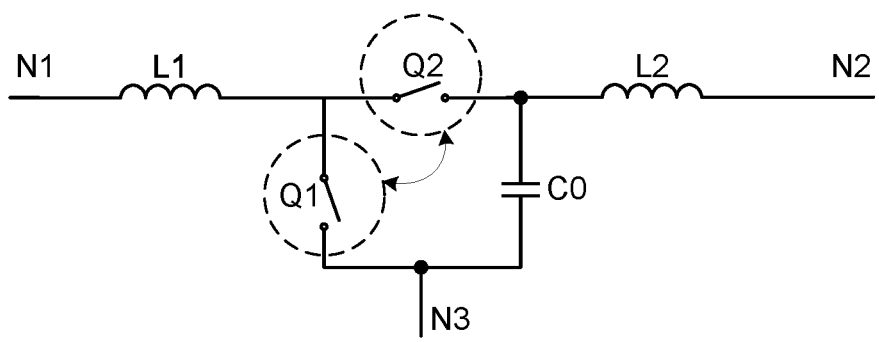
Figure 21:
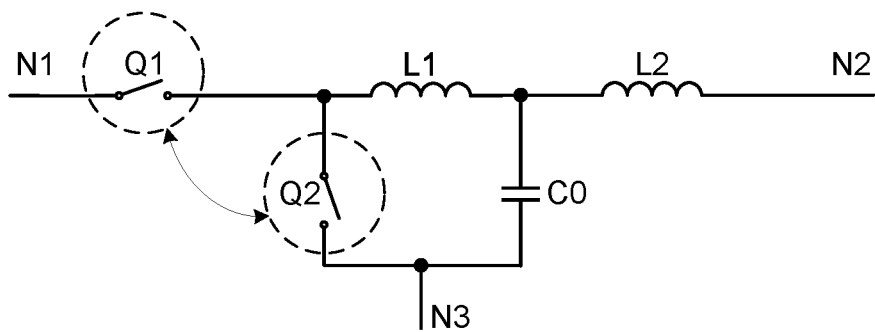
Figure 22:
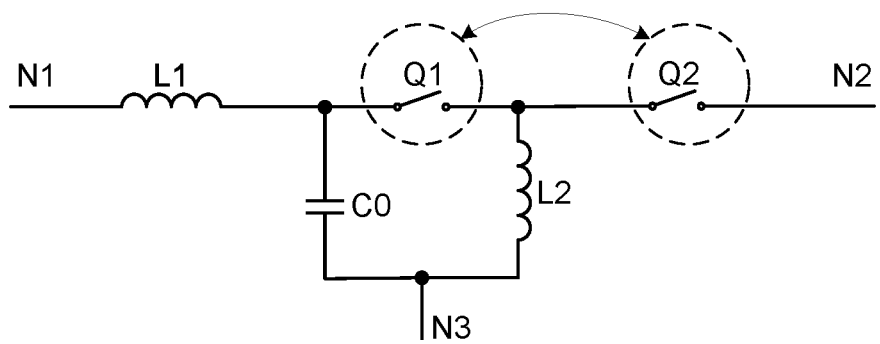
Figure 23:
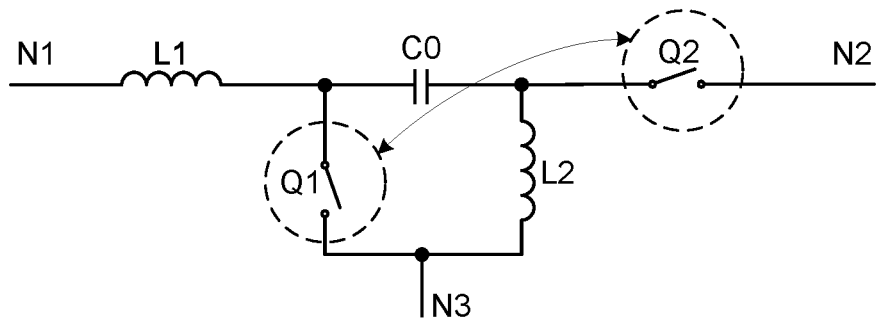
Figure 24:
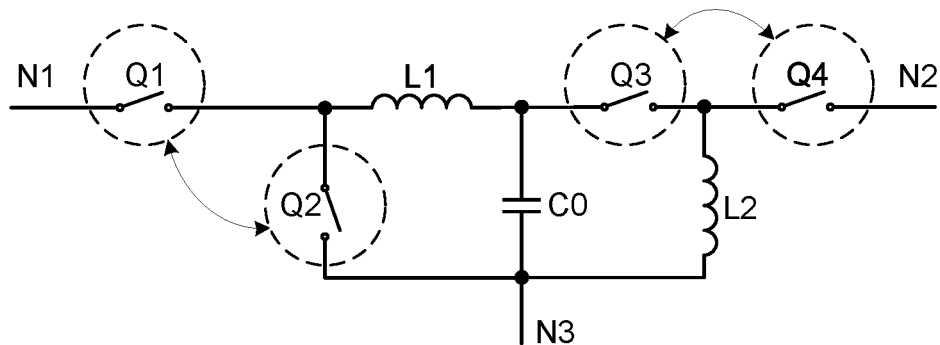
Figure 25:
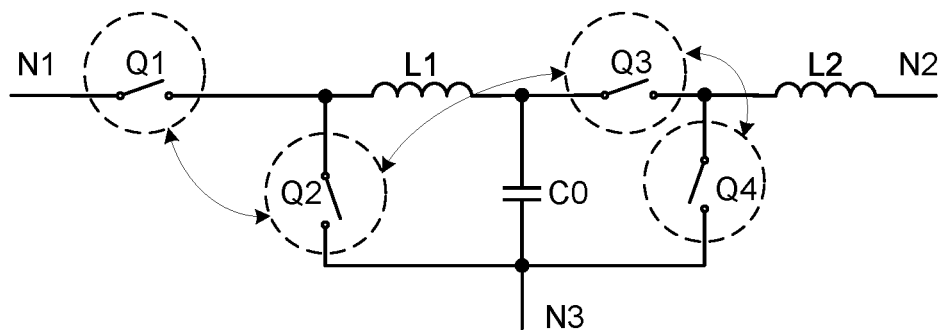
Figure 26:
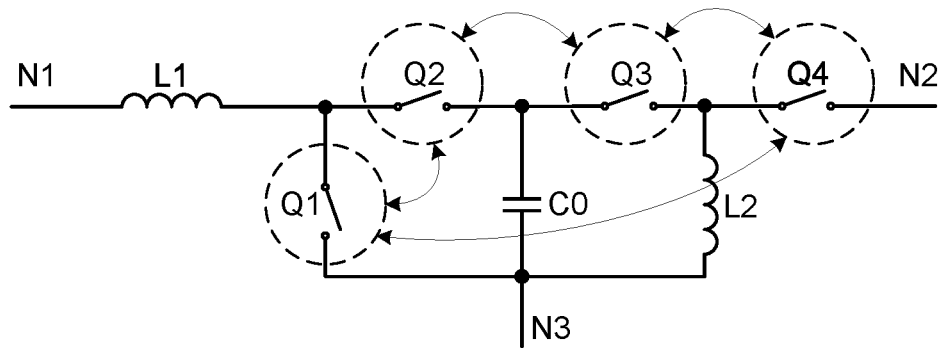
Figure 27:
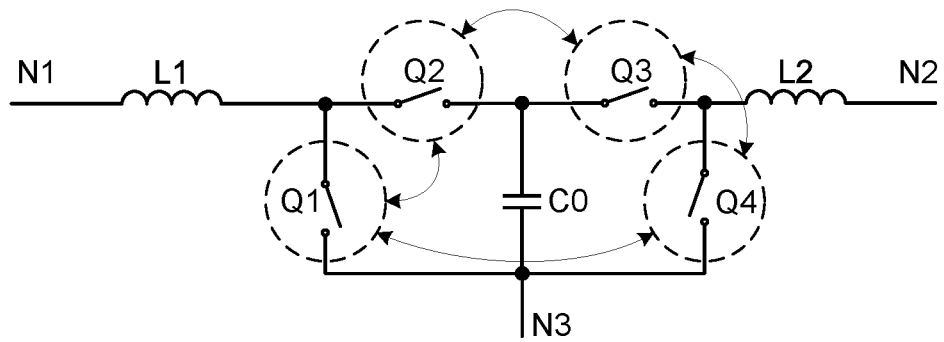
Figure 28:
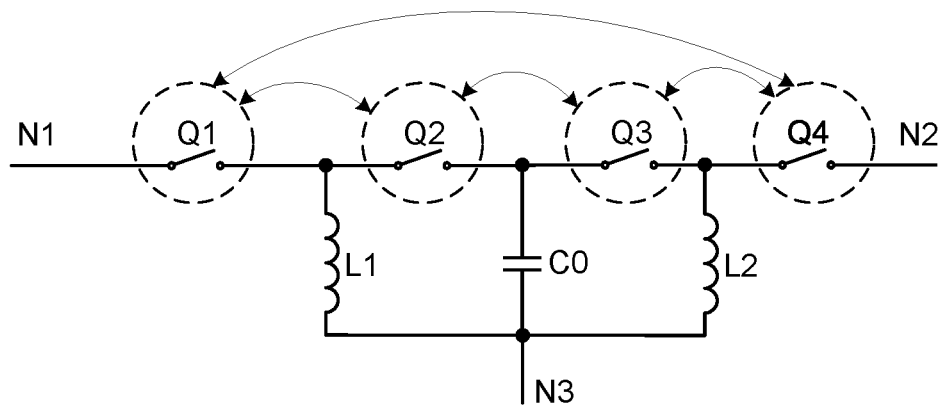
Figure 29:
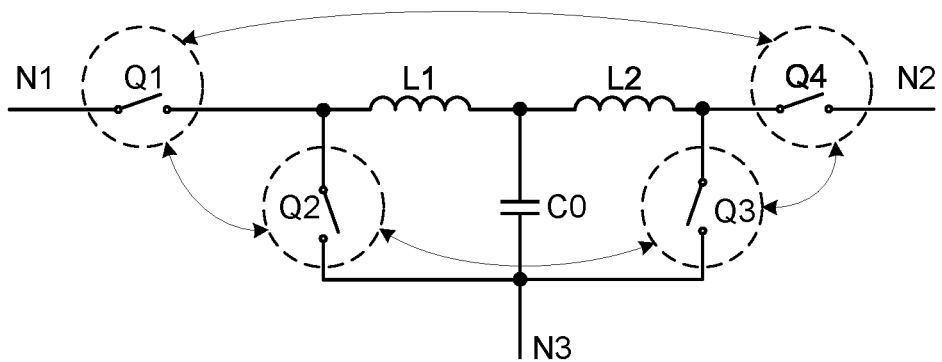
Figure 30:
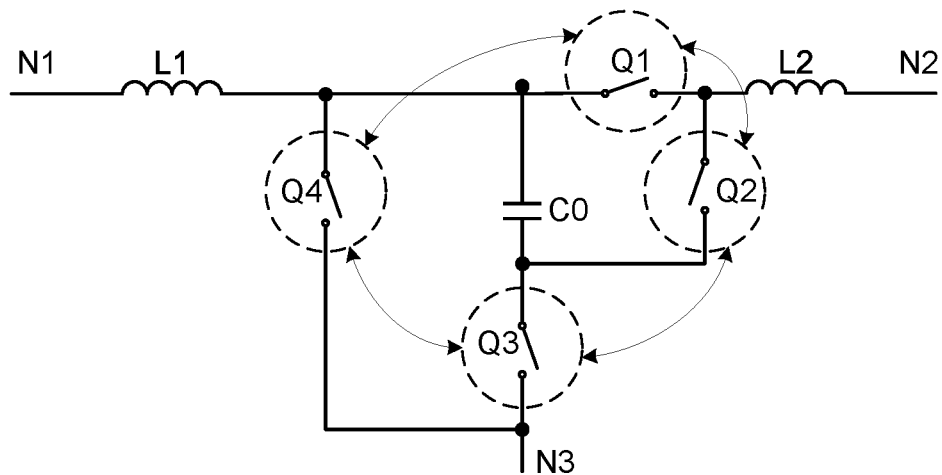

In alternative embodiments, other switch pairs from FIG. 16 may be split into two pairs of two switches and a capacitor inserted between the newly-formed nodes between the new pairs of switches. For example, FIG. 18 is a schematic diagram of a 2-level converter cell 1800 of order 1 using 4 switches, showing examples of circled associated pairs of switches that may each be split into new pairs of switches and coupled by a capacitor between newly formed inter-switch nodes. The circled associated pairs of switches are: Q1 and Q2 (as shown in FIG. 17) [line 1]; Q3 and Q4 [line 2]; Q1 and Q4 [ line 3]; and Q2 and Q3 [line 4].

Additional topologies providing more than 3 node voltage levels can be generated by iteratively applying methods like those of FIG. 5A or 5B to the topology of FIG. 17. For example, a 4-level converter topology may be generated from the circuit of FIG. 17B by application of methods like those described in FIGS. 5A-5C by splitting the following sets of switch pairs and connecting the newly formed inter-switch nodes with respective capacitors: Q1 and Q2 [line 1802] plus Q3 and Q4 [ line 1804], or Q1 and Q4 [line 1806] plus Q2 and Q3 [line 1808].

A notable feature of multi-level converter cell topologies like the 3-level buck-boost converter cell shown in FIG. 17 is that they may be operated as a lower-level converter cell by selected settings of their switch states using suitable control circuitry. For example, the 3-level topology shown in FIG. 17 may be operated as a 2-level boost converter cell by closing switches Q11 and Q12, opening switches Q21 and Q22, and cycling switches Q3 and Q4 at different frequencies. As another example, the 3-level topology shown in FIG. 17 may be operated as a 3-level buck converter cell by closing switch Q4, opening switch Q3, and operating switches Q11, Q12, Q21, and Q22 at a frequency and a selected state sequence so as to result in a 3-level buck converter cell.

Additional Converter Cell Embodiments

As should be appreciated, the processes set forth in FIGS. 5A-5C, or variants of those processes, may be applied to other converter cell topologies. Such 2-level converter cells may include a transformer or coupled inductors.

For example, FIGS. 19-30 are schematic diagrams of a few of 2-level converter cell circuit topologies that may be transformed to higher level converter cells by applying the processes set forth in FIGS. 5A-5C, or variants of those processes. Each figure shows examples of circled associated pairs of switches connected by a curved double-arrow connecting line. By applying the processes of the present disclosure, the associated pairs of switches may each be split into new pairs of switches and coupled by a capacitor between the newly-formed nodes situated between the new pairs of switches to form 3-level converter cells. As should be clear, the processes of the present disclosure may be iteratively applied to the newly transformed topologies to generate even higher level converter cells (e.g., 4-level and 5-level).

Figure 31:
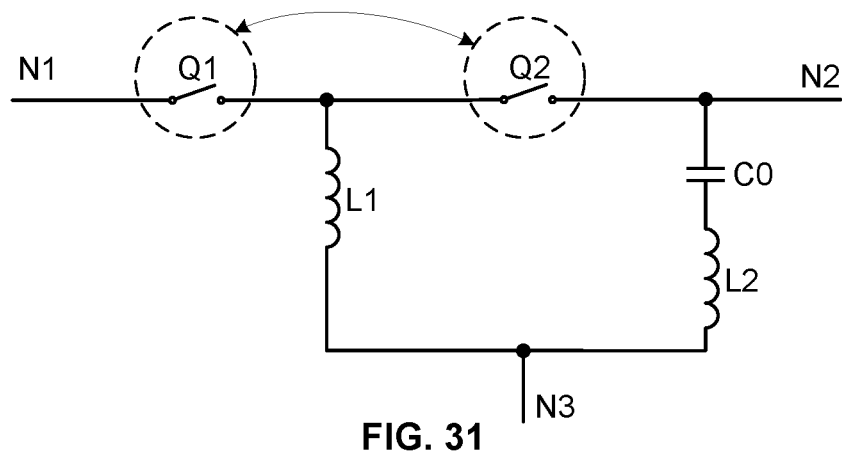
FIGS. 31-33 are schematic diagrams of a few examples of more complex converter cell circuit topologies which may be transformed to higher level converter cells by applying the processes set forth in FIGS. 5A-5C, or variants of those processes.
Figure 32:
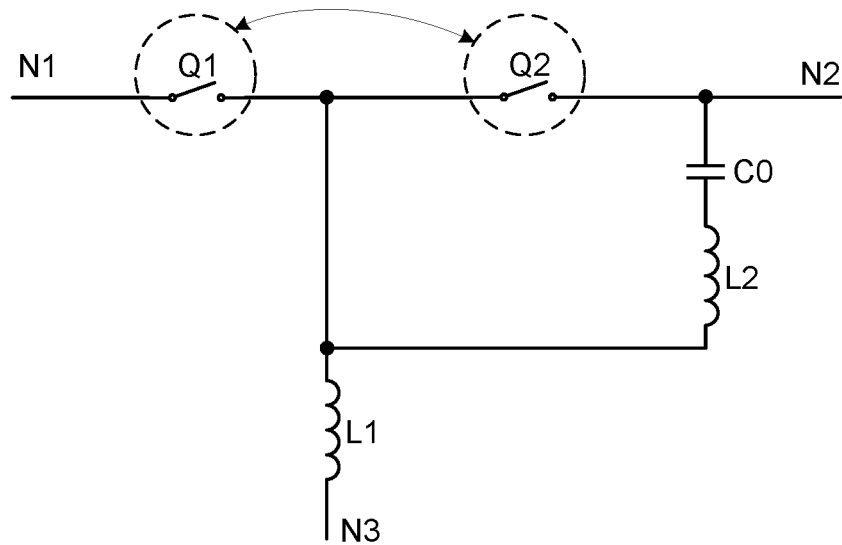
Figure 33:
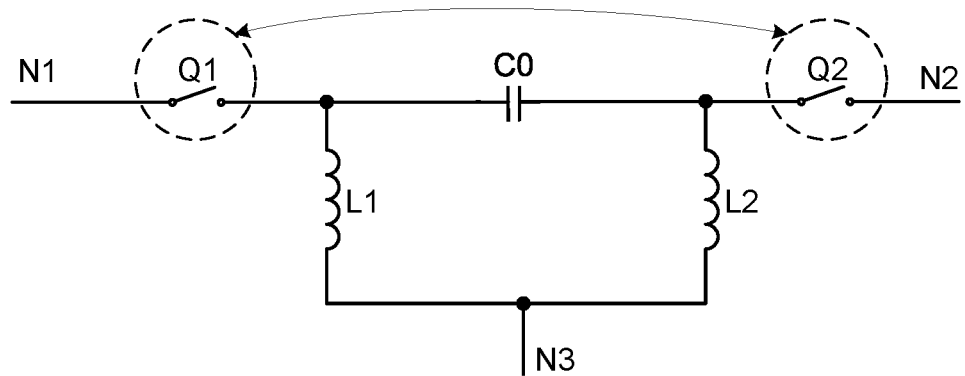

The present invention is not limited to simple converter cell circuit topologies. For example, FIGS. 31-33 are schematic diagrams of a few examples of more complex converter cell circuit topologies which may be transformed to higher level converter cells by applying the processes set forth in FIGS. 5A-5C, or variants of those processes. Each figure shows examples of circled associated pairs of switches connected by a curved double-arrow connecting line. By applying the processes of the present disclosure, the associated pairs of switches may each be split into new pairs of switches and coupled by a capacitor inserted the newly-formed nodes between the new pairs of switches. As should be clear, the processes of the present disclosure may be iteratively applied to the newly transformed topologies to generate even higher level converter cells (e.g., 4-level and 5-level).

Configurations of Multiple Converter Cells

Figure 34:
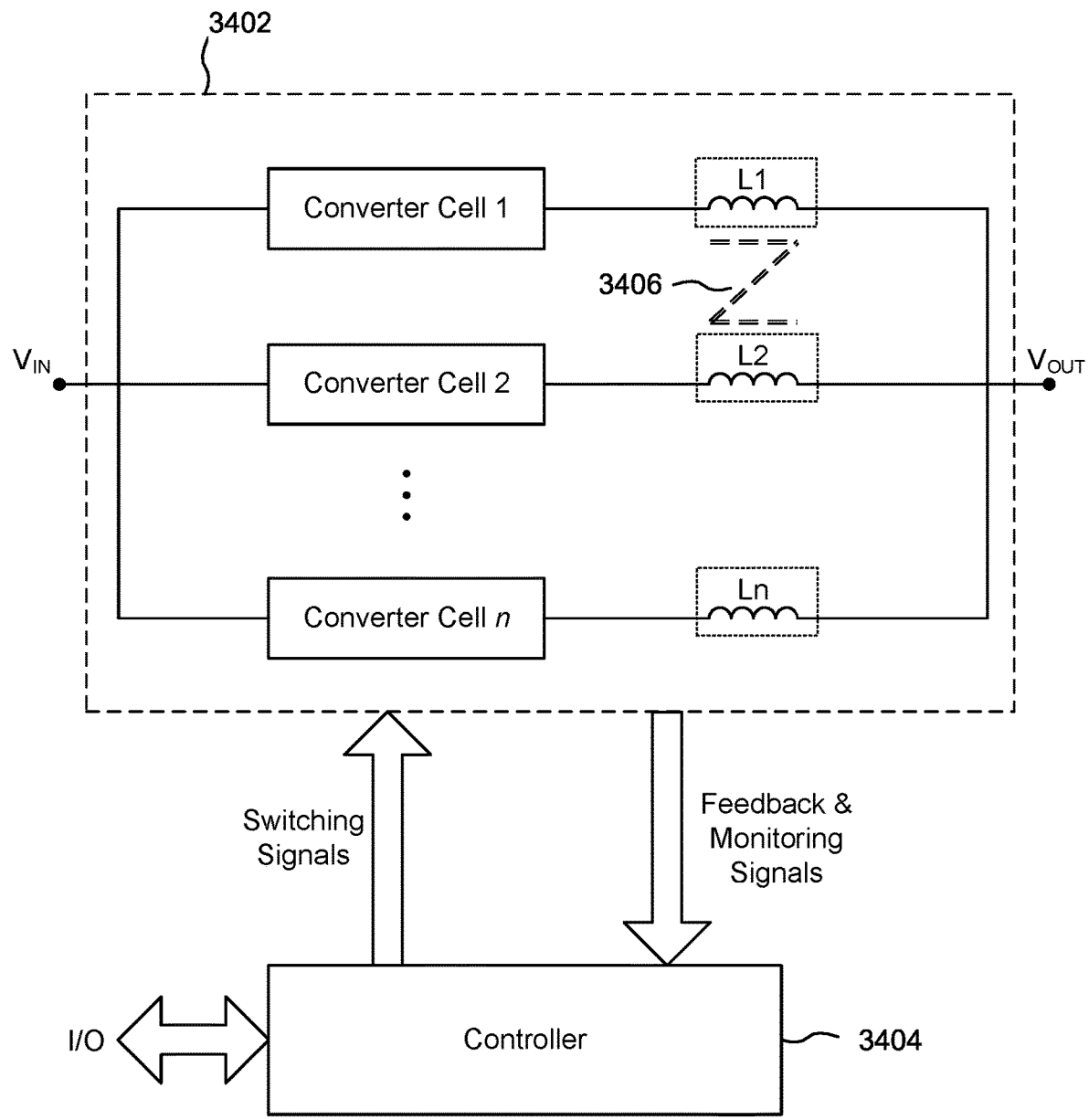
FIG. 34 is a block diagram showing one example of a multi-cell configuration that includes two or more converter cells 1–n coupled in parallel, with common inputs $V_{IN}$ and common outputs $V_{OUT}$.

FIG. 34 is a block diagram 3400 showing one example of a multi-cell configuration 3402 that includes two or more converter cells 1–n coupled in parallel, with common inputs $V_{IN}$ and common outputs $V_{OUT}$. At least one of the converter cells 1-n is a modified 2-level converter cell improved in accordance with the teachings of this disclosure to be an M-level converter cell. The multi-cell configuration 3402 is shown coupled to a controller 3404, which received feedback and monitoring signals from the converter cells 1-n and provides switching signals to the converter cells 1-n. The feedback and monitoring signals may be, for example, capacitor voltages within the converter cells 1-n, the value of $V_{IN}$ and/or $V_{OUT}$, the current through each converter cell, etc. The controller 3404 may be coupled to other circuitry through input/output (I/O) signals. The controller 3404 in FIG. 34 is a simplified representation of a controller which may be configured to control other multi-level architectures, including one or more multi-level converter cells of the types described in this disclosure.

In some embodiments, two or more selected converter cells 1-n are coupled to the output terminal through corresponding optional inductors L1-Ln (generically, "$L_X$"). The inductors L1-Ln may be external to the corresponding converter cells 1-n, or internal to the corresponding converter cells 1-n. For purposes of example only, the inductors L1-Ln are shown as being external to the corresponding converter cells 1-n.

In a first embodiment of the multi-cell configuration 3402, two or more selected converter cells 1-n are operated (via controller 3404) with differential clocking phases, meaning that the switching signals to each selected converter cell are skewed in time with respect to the switching signals to each other selected converter cell. For example, an embodiment of the multi-cell configuration 3402 may operate with 4 phases, each phase 90 degrees out of phase with respect to each other. As another example, embodiment an of the multi-cell configuration 3402 may operate with 5 phases, each phase 60 degrees out of phase with respect to each other. Such a "multi-phase" configuration helps to reduce voltage ripples at $V_{OUT}$.

In a second embodiment of the multi-cell configuration 3402 that includes respective inductors $L_X$ for at least two selected converter cells 1-n, at least two of the inductors optionally may be magnetically coupled. In the illustrated example, a coupling-line 3406 indicates that inductors L1 and L2 corresponding to converter cell 1 and converter cell 2 are magnetically coupled with opposite poles. In such a coupled-inductor configuration, it is generally desirable that the coupling factor (i.e., the ratio of incident power to the coupled power, both measured in dB) for the magnetically coupled inductors be high (e.g., closer to 1—ideal coupling—than zero).

The inductors $L_X$ resist changes in current. In steady-state operation, when the load for the multi-cell configuration 3402 is relatively stable, large-valued inductors help stabilize the output of the parallel converter cells 1-n. However, during transient conditions, such as when the load varies, large-valued inductors resist rapid changes in the output of the parallel converter cells 1-n as they try to adapt to the new load conditions. One advantage of a coupled-inductor configuration is that during transient events, the magnetically-coupled inductors essentially cancel each other out, effectively resulting in a "dynamic" low inductance at the respective outputs of the coupled converter cells, thereby allowing faster adaptation by the converter cells 1-n to the new load conditions.

A third embodiment of the multi-cell configuration 3402 combines a multi-phase configuration with a coupled-inductor configuration.

A fourth embodiment of the multi-cell configuration 3402 combines a multi-phase configuration with a coupled-inductor configuration using conventional converter cell designs (that is, converter cell topologies not modified by processes like those described in FIGS. 5A-5C).

Example Control Circuitry for an M-level Converter Cell

Figure 35:
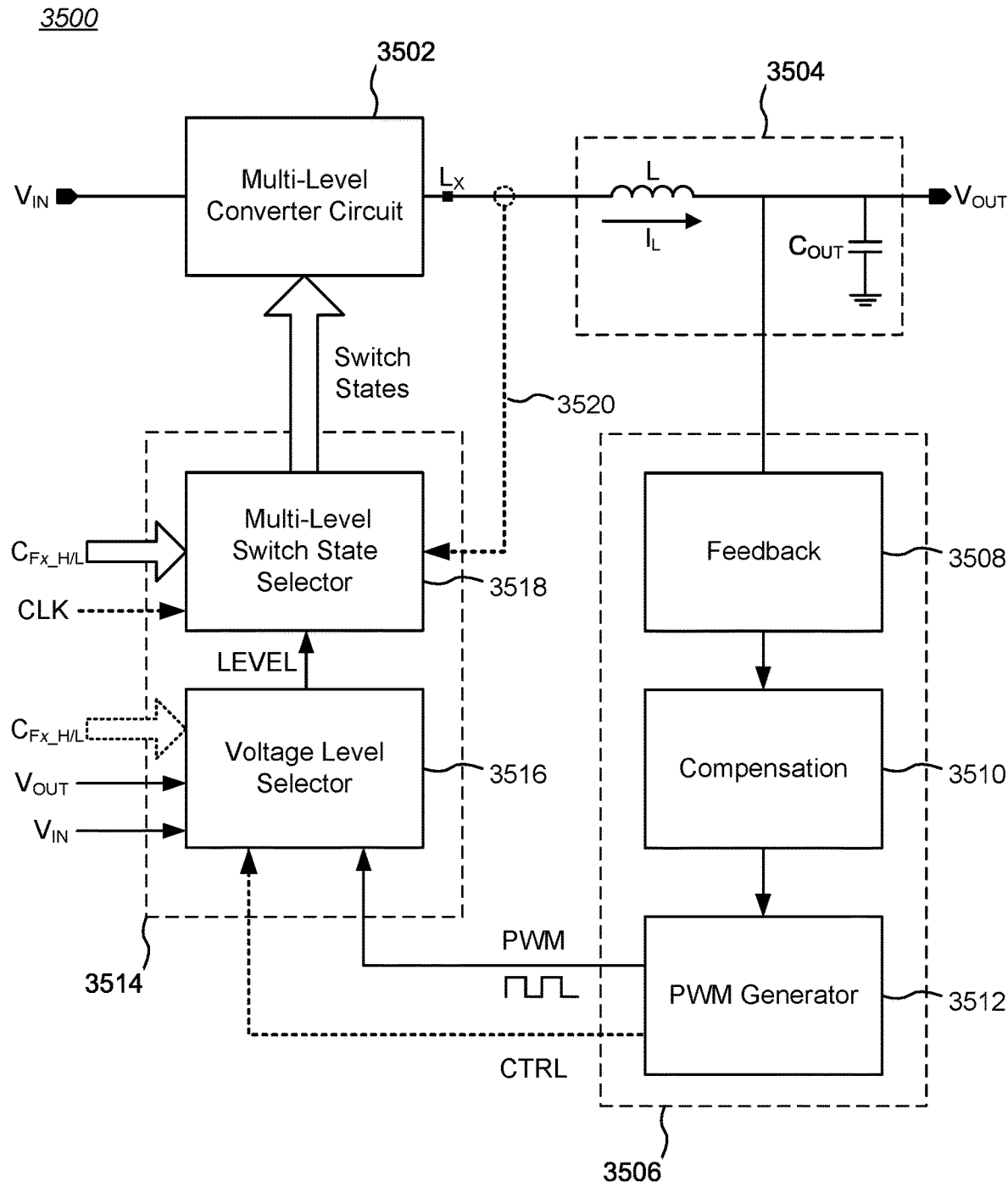
FIG. 35 is a block diagram of one embodiment of control circuitry for an M-level converter cell coupled to an output block comprising an inductor L and an output capacitor $C_{OUT}$ (conceptually, the inductor L also may be considered as being included within the M-level converter cell).

FIG. 35 is a block diagram of one embodiment of control circuitry 3500 for an M-level converter cell 3502 coupled to an output block 3504 comprising an inductor L and an output capacitor $C_{OUT}$ (conceptually, the inductor L also may be considered as being included within the M-level converter cell 3502). This example control circuitry 3500 is adapted from the teachings set forth in U.S. Patent Application Ser. No. 63/276,923, filed Nov. 8, 2021, entitled "Controlling Charge-Balance and Transients in a Multi-Level Power Converter", assigned to the assignee of the present invention, the contents of which are incorporated by reference. However, the present invention may be used in combination with other types of control circuitry for an M-level converter cell 3502.

The control circuitry 3500 functions as a control loop coupled to the output of the M-level converter cell 3502 and to switch control inputs of the M-level converter cell 3502. In general, the control circuitry 3500 is configured to monitor the output (e.g., voltage and/or current) of the M-level converter cell 3502 and dynamically generate a set of switch control inputs to the M-level converter cell 3502 that attempt to stabilize the output voltage and/or current at specified values, taking into account variations of $V_{IN}$ and output load. In alternative embodiments, the control circuitry 3500 may be configured to monitor the input of the M-level converter cell 3502 (e.g., voltage and/or current) and/or an internal node of the M-level converter cell 3502 (e.g., the voltage across one or more fly capacitors or the current through one or more power switches). Accordingly, most generally, the control circuitry 3500 may be configured to monitor the voltage and/or current of a node (e.g., input terminal, internal node, or output terminal) of the M-level converter cell 3502. The control circuitry 3500 may be incorporated into, or separate from, the overall controller 104 for a power converter 100 embodying the M-level converter cell 3502.

A first block comprises a feedback controller 3506, which may be a traditional controller such as a fixed frequency voltage mode or current mode controller, a constant-on-time controller, a hysteretic controller, or any other variant. The feedback controller 3506 is shown as being coupled to $V_{OUT}$ from the M-level converter cell 3502. In alternative embodiments, the feedback controller 3506 may be configured to monitor the input of the M-level converter cell 3502 and/or an internal node of the M-level converter cell 3502. The feedback controller 3506 produces a signal directly or indirectly indicative of the voltage at $V_{OUT}$ that determines in general terms what needs to be done in the M-level converter cell 3502 to maintain desired values for $V_{OUT}$ (charge, discharge, or tri-state (i.e., open, with no current flow).

In the illustrated example, the feedback controller 3506 includes a feedback circuit 3508, a compensation circuit 3510, and a PWM generator 3512. The feedback circuit 3508 may include, for example, a feedback-loop voltage detector which compares $V_{OUT}$ (or an attenuated version of $V_{OUT}$) to a reference voltage which represents a desired $V_{OUT}$ target voltage (which may be dynamic) and outputs a control signal to indicate whether $V_{OUT}$ is above or below the target voltage. The feedback-loop voltage detector may be implemented with a comparison device, such as an operational amplifier (op-amp) or transconductance amplifier (gm amplifier).

The compensation circuit 3510 is configured to stabilize the closed-loop response of the feedback controller 3506 by avoiding the unintentional creation of positive feedback, which may cause oscillation, and by controlling overshoot and ringing in the step response of the feedback controller 3506. The compensation circuit 3510 may be implemented in known manner, and may include LC and/or RC circuits.

The PWM generator 3512 generates the actual PWM control signal which ultimately sets the duty cycle of the switches of the M-level converter cell 3502. In some embodiments, the PWM generator 3512 may pass on additional optional control signals CTRL indicating, for example, the magnitude of the difference between $V_{OUT}$ and the reference voltage (thus indicating that some levels of the M-level converter cell 3502 should be bypassed to get to higher or lower levels), and the direction of that difference (e.g., $V_{OUT}$ being greater than or less than the reference voltage). In other embodiments, the optional control signals CTRL can be derived from the output of the compensation circuit 3510, or from the output of the feedback circuit 3508, or from a separate comparator (not shown) coupled to, for example, $V_{OUT}$. One purpose of the optional control signals CTRL is for advanced control algorithms, when it may be beneficial to know how far away $V_{OUT}$ is from a target output voltage, thus allowing faster charging of the inductor L if the $V_{OUT}$ is severely under regulated.

A second block comprises an M-level controller 3514, the primary function of which is to select the switch states that generate a desired $V_{OUT}$ while maintaining a charge-balance state on the fly capacitors within the M-level converter cell 3502 every time an output voltage level is selected, regardless of what switch state or states were used in the past.

The M-level controller 3514 includes a Voltage Level Selector 3516 which receives the PWM control signal and the additional control signals CTRL if available. In addition, the Voltage Level Selector 3516 may be coupled to $V_{OUT}$ and/or $V_{IN}$, and, in some embodiments, to HIGH/LOW status signals, $C_{Fx\_H/L}$, from voltage detectors coupled to corresponding fly capacitors $C_{Fx}$ within the M-level converter cell 3502. A function of the Voltage Level Selector 3516 is to translate the received signals to a target output voltage level (e.g., on a cycle-by-cycle basis). The Voltage Level Selector 3516 typically will consider at least $V_{OUT}$ and $V_{IN}$ to determine which target level should charge or discharge the output of the M-level converter cell 3502 with a desired rate.

The output of the Voltage Level Selector 3516 is coupled to an M-level Switch State Selector 3518, which generally would be coupled to the status signals, $C_{Fx\_H/L}$, from the capacitor voltage detectors for the fly capacitors $C_{Fx}$. Taking into account the target level generated by the Voltage Level Selector 3516, the M-level Switch State Selector 3518 determines which switch state for the desired output level should be best for capacitor charge-balance. The M-level Switch State Selector 3518 may be implemented, for example, as a look-up table (LUT) or as comparison circuitry and combinatorial logic or more generalized processor circuitry. The output of the M-level Switch State Selector 3518 is coupled to the switches of the M-level converter cell 3502 (through appropriate level-shifter circuits and drivers circuits, as may be needed for a particular converter cell) and includes the switch state settings determined by the M-level Switch State Selector 3518 (which selects the configuration of switches within the M-level converter cell 3502 corresponding to a selected target level).

In general (but not always), the Voltage Level Selector 3516 and the M-level Switch State Selector 3518 only change their states when the PWM signal changes. For example, when the PWM signal goes high, the Voltage Level Selector 3516 selects which level results in charging of the inductor L and the M-level Switch State Selector 3518 sets which version to use of that level. Then when the PWM signal goes low, the Voltage Level Selector 3516 selects which level should discharge the inductor L and the M-level Switch State Selector 3518 sets which version of that level to use. Thus, the Voltage Level Selector 3516 and the M-level Switch State Selector 3518 generally only change states when the PWM signal changes (the PWM signal is in effect their clock signal). However, there may be situations or events where it is desirable for the CTRL signals to change the state of the Voltage Level Selector 3516. Further, there may be situations or events where it is desirable for the $C_{Fx\_H/L}$ status signal(s) from voltage detectors coupled to the fly capacitors $C_{Fx}$, within the M-level converter cell 3502 to cause the M-level Switch State Selector 3518 to select a particular configuration of power switch settings, such as when a severe mid-cycle imbalance occurs. In some embodiments, it may be useful to include a timing function that forces the M-level Switch State Selector 3518 to re-evaluate the optimal version of the state periodically, for example, in order to avoid being "stuck" at one level for a very long time, potentially causing charge imbalances.

In embodiments that utilize the teachings set forth in the patent application entitled "*Controlling Charge-Balance and Transients in a Multi-Level Power Converter*" referenced above, the M-level controller 3514 implements a control method for the M-level converter cell 3502 that selects an essentially optimal switch state which moves the fly capacitors $C_{Fx}$ towards a charge-balance state every time a voltage level at the $L_X$ node is selected, regardless of what switch state or states were used in the past. Accordingly, such multi-level converter circuits are free to select a different switch state or $L_X$ voltage level every switching cycle without a need to keep track of any prior switch state or sequence of switch states.

One notable benefit of the control circuitry shown in FIG. 35 is that it enables generation of voltages in boundary zones between voltage levels, which represent unattainable output voltages for conventional multi-level DC-to-DC converter circuits.

In alternative unregulated charge-pumps embodiments, the feedback controller 3506 and the Voltage Level Selector 3516 may be omitted, and instead a clock signal CLK may be applied to the M-level Switch State Selector 3518. The M-level Switch State Selector 3518 would generate a pattern of switch state settings that periodically charge balances the fly capacitors $C_{Fx}$ regardless of what switch state or states were used in the past (as opposed to cycling through a pre-defined sequency of states). This ensures that if $V_{IN}$ changes or anomalous evens occur, the system generally always seeks charge balance for the fly capacitors $C_{Fx}$.

In some embodiments, the M-level Switch State Selector 3518 may take into account the current $I_L$ flowing through the inductor L by way of an optional current-measurement input 3520, which may be implemented in conventional fashion.

While FIG. 35 shows a particular embodiment of control circuitry for an M-level converter cell as modified in accordance with the present invention, it should be appreciated that other control circuits may be adapted or devised to provide suitable switching signals for the switches within a converter cell.

Common Circuit Details for Multi-Level Converters

In power converters, particularly multi-level power converters, the power switches may be implemented with FETs, especially MOSFETs. For each power FET, a level shifter and a driver circuit are generally required to translate ground-referenced low-voltage logic ON/OFF signals from an analog or digital controller into a signal with the same voltage swing but referenced to the source voltage of the power FET that the signal is driving in order to charge or discharge the gate of the power FET and thereby control the conducting or blocking state of the power FET. In some applications, the functions of a level shifter and a driver circuit may be incorporated into one circuit.

General Benefits

When compared to conventional 2-level converter cells, M-level topologies generated by application of processes like those described in FIGS. 5A-5C provide higher power density and/or efficiency at wide dynamic range of input/output voltages. For example, a 3-level modified converter cell may be reduced in size by a factor of 2× to 4× relative to the underlying 2-level converter cell. As noted above, such a reduction in size generally also means a reduction in power consumption for switching. Both reduced physical size and better power efficiency are especially important for implementing power conversion solutions in applications such as battery-powered portable electronic devices (e.g., mobile cell phones).

M-level topologies generated by application of processes like those described in FIGS. 5A-5C also enable a reduction in the stress across passive elements and switches (e.g., FET devices) by reducing the voltage at many nodes. As a result, switches, capacitors, and/or inductors may be made smaller.

Thus, in an apparent paradox, by adding switches and capacitors by application of processes like those described in FIGS. 5A-5C, the total number of components may actually decrease compared to a multi-level converter created by applying another process. For example, with a reduction in voltage exposure, a switch may require a much lower degree of stacking of transistors, thus eliminating one or more transistors. Such a multi-level converter may also need less capacitance, so fewer parallel capacitors may be needed to meet the capacitance requirements.

Additional Control and Operational Considerations

It may be desirable to provide additional control and operational circuitry (or one or more shutdown procedures) that enables reliable and efficient operation of a power converter utilizing a multi-level converter cell designed in accordance with the present disclosure. For example, in a step-down power converter, the output voltage of a converter cell is less than the input voltage of the converter cell. Shutting down or disabling (e.g., because of a fault event, such as a short) a converter cell having a designed-in inductance connected to the output while the output load current is non-zero generally requires some means for discharging the inductor current. In some embodiments, a bypass switch may be connected in parallel with a designed-in inductance connected to the output of a converter cell and controlled to be open during normal operation and closed when shutting down the converter cell or if a fault event occurs. Ideally, in order to prevent transient ringing and to provide safe discharge of the inductor current, the bypass switch can be closed before disabling converter cell switching. In alternative embodiments using MOSFETs for the main switches of the converter, the inherent body diode connected between the body and drain terminals of each MOSFET can also discharge the inductor current. Details of these solutions, as well as alternative shutdown solutions, are taught in U.S. Pat. No. 10,686,367, issued Jun. 16, 2020, entitled "Apparatus and Method for Efficient Shutdown of Adiabatic Charge Pumps", assigned to the assignee of the present invention, the contents of which are incorporated by reference.

Another consideration when combining converter cells in parallel is controlling multiple parallel power converters in order to avoid in-rush current (e.g., during a soft-start period for the power converters) and/or switch over-stress if all of the power converters are not fully operational, such as during startup or when a fault condition occurs. Conditional control may be accomplished by using node status detectors coupled to selected nodes within parallel-connected power converters to monitor voltage and/or current. Such node status detectors may be configured in some embodiments to work in parallel with an output status detector measuring the output voltage of an associated power converter during startup. The node status detectors ensure that voltages across important components (e.g., fly capacitors and/or switches) within the converter cell(s) of the power converters are within desired ranges before enabling full power steady-state operation of the parallel power converters, and otherwise prevent full power steady-state operation. The node status detectors may be coupled to a master controller that controls one or more of the parallel power converters using one or more common control signals. In furtherance of a master controller configuration, the parallel power converters may each report a power good signal (Pgood) when ready to leave a startup phase for full power steady-state operation. The master controller may essentially "AND" all such Pgood signals together, possibly along with one or more status signals from other circuits, such that the master controller does not enable full power steady-state operation of any the parallel power converter unless all of the parallel power converters are ready for that state. In essence, the Pgood signals from each parallel power converter are all tied together such that the parallel power converters may not transition out of startup phase until all the Pgood signals indicate that they are ready to transition to steady operation. Furthermore, if the Pgood signal changes due to a fault condition in one or more of the parallel power converters, the parallel power converters can transition from a steady state operation to an auto-restart or shutdown operation. Details of these solutions, as well as alternative shutdown solutions, are taught in U.S. Pat. No. 10,992,226, issued Apr. 27, 2021, entitled "*Startup Detection for Parallel Power Converters*", assigned to the assignee of the present invention, the contents of which are incorporated by reference.

Another consideration in operating multi-level converter cells is attaining (i.e., pre-charging) and maintaining fly capacitor voltages that are essentially fully proportionally balanced so that all switches are subjected to a similar voltage stress, since unbalanced fly capacitors can lead to breakdown of a switch (particularly FET switches) due to exposure to high voltages. One solution to both pre-charging capacitor voltages and operational balancing of capacitor voltages in a multi-level DC-to-DC converter circuit is to provide a parallel "shadow" circuit that conditionally couples a fly capacitor to a voltage source or other circuit to pre-charge that capacitor, or conditionally couples two or more fly capacitors together to transfer charge from a higher voltage capacitor to a lower voltage capacitor, or conditionally couples a fly capacitor to a voltage sink to discharge that capacitor, all under the control of real-time capacitor voltage measurements. Each parallel "shadow" circuit may comprise a switch and a resistor coupled in parallel with a main switch that is part of a multi-level converter cell (in some cases, one switch-resistor pair may span two series-connected switches). This particular solution for pre-charging and/or balancing charge on fly capacitors is very fast, provides slow pre-charging of the fly capacitors during a pre-charge period, protects switches from in-rush current, and provides stable voltages for converter cell switches. Details of this solution, as well as alternative pre-charging and charge balancing solutions, are taught in U.S. Pat. No. 10,720,843, issued Jul. 21, 2020, entitled "*Multi-Level DC-DC Converter with Lossy Voltage Balancing*", assigned to the assignee of the present invention, the contents of which are incorporated by reference.

Another solution to balancing capacitor voltages in a multi-level DC-to-DC converter circuit is to provide a lossless voltage balancing solution where out-of-order state transitions of a multi-level DC-to-DC converter cell are allowed to take place during normal operation. The net effect of out-of-order state transitions is to increase or decrease the voltage across specific fly capacitors, thus preventing voltage overstress on the main switches of the DC-to-DC converter. In some embodiments, restrictions are placed on the overall sequence of state transitions to reduce or avoid transition state toggling, thereby allowing each capacitor an opportunity to have its voltage steered as necessary, rather than allowing one capacitor to be voltage balanced before voltage balancing another capacitor. Details of this solution, as well as alternative charge balancing solutions, are taught in U.S. Pat. No. 10,770,974, issued Sep. 8, 2020, entitled "Multi-Level DC-DC Converter with Lossless Voltage Balancing", assigned to the assignee of the present invention, the contents of which are incorporated by reference.

An additional consideration for some embodiments is enabling operation of multi-level converter cells such that voltages can be generated in boundaries zones between voltage levels. "Boundary zones" represent unattainable output voltages for conventional multi-level DC-to-DC converter circuits. In order to generate output voltages within a boundary zone, some embodiments essentially alternate (toggle) among adjacent (or even nearby) zones by setting states of the converter cell switches in a boundary zone transition pattern. For example, a 3-level DC-to-DC converter circuit may operate in Zone 1 for a selected time and in adjacent Zone 2 for a selected time. Thus, Zones 1 and 2 are treated as a single "super-zone". More generally, in some cases, it may be useful to create super-zones using non-adjacent zones or using more than two zones (adjacent and/or non-adjacent). Details of this solution are taught in U.S. Pat. No. 10,720,842, issued Jul. 21, 2020, entitled "*Multi-Level DC-DC Converter with Boundary Transition Control*", assigned to the assignee of the present invention, the contents of which are incorporated by reference.

Yet another consideration for some embodiments is protection of the main power switches and other components within a power converter from stress conditions, particular from voltages that exceed the breakdown voltage of such switches (particularly FET switches). One means for protecting a multi-level power converter uses at least one high-voltage FET switch while allowing all or most other main power switches to be low-voltage FET switches.

In power converters, particularly multi-level power converters, the power switches may be implemented with FETs, especially MOSFETs. For each power FET, a driver circuit is generally required. In addition, for some power FETs, a level shifter may be required to translate ground-referenced low-voltage logic ON/OFF signals from an analog or digital controller into a signal with the same voltage swing but referenced to the source voltage of the power FET that the signal is driving in order to charge or discharge the gate of the power FET and thereby control the conducting or blocking state of the power FET. In some applications, the functions of a level shifter and a driver circuit may be incorporated into one circuit.

As should be clear, the multi-level power converter embodiments described in this disclosure may be synergistically combined with the teachings of one or more of the additional control and operational circuits and methods described in this section.

General Benefits and Advantages of Multi-Level Power Converters

Embodiments of the current invention improve the power density and/or power efficiency of incorporating circuits and circuit modules or blocks. As a person of ordinary skill in the art should understand, a system architecture is beneficially impacted utilizing embodiments of the current invention in critical ways, including lower power and/or longer battery life. The current invention therefore specifically encompasses system-level embodiments that are creatively enabled by inclusion in a large system design and application.

More particularly, multi-level power converters provide or enable numerous benefits and advantages, including:
- adaptability to applications in which input and/or output voltages may have a wide dynamic-range (e.g., varying battery input voltage levels, varying output voltages);
- efficiency improvements on the run-time of devices operating on portable electrical energy sources (batteries, generators or fuel cells using liquid or gaseous fuels, solar cells, etc.);
- efficiency improvements where efficiency is important for thermal management, particularly to protect other components (e.g., displays, nearby ICs) from excessive heat;
- enabling design optimizations for power efficiency, power density, and form-factor of the power converter—for example, smaller-size multi-level power converters may allow placing power converters in close proximity to loads, thus increasing efficiency, and/or to lower an overall bill of materials;
- the ability to take advantage of the performance of smaller, low voltage transistors;
- adaptability to applications in which power sources can vary widely, such as batteries, other power converters, generators or fuel cells using liquid or gaseous fuels, solar cells, line voltage (AC), and DC voltage sources (e.g., USB, USB-C, power-over Ethernet, etc.);
- adaptability to applications in which loads may vary widely, such as ICs in general (including microprocessors and memory ICs), electrical motors and actuators, transducers, sensors, and displays (e.g., LCDs and LEDs of all types);
- the ability to be implemented in a number of IC technologies (e.g., MOSFETs, GaN, GaAs, and bulk silicon) and packaging technologies (e.g., flip chips, ball-grid arrays, wafer level scale chip packages, wide-fan out packaging, and embedded packaging).

The advantages and benefits of multi-level power converters enable usage in a wide array of applications. For example, applications of multi-level power converters include portable and mobile computing and/or communication products and components (e.g., notebook computers, ultra-book computers, tablet devices, and cell phones), displays (e.g., LCDs, LEDs), radio-based devices and systems (e.g., cellular systems, WiFi, Bluetooth, Zigbee, Z-Wave, and GPS-based devices), wired network devices and systems, data centers (e.g., for battery-backup systems and/or power conversion for processing systems and/or electronic/optical networking systems), internet-of-things (IOT) devices (e.g., smart switches and lights, safety sensors, and security cameras), household appliances and electronics (e.g., set-top boxes, battery-operated vacuum cleaners, appliances with built-in radio transceivers such as washers, dryers, and refrigerators), AC/DC power converters, electric vehicles of all types (e.g., for drive trains, control systems, and/or infotainment systems), and other devices and systems that utilize portable electricity generating sources and/or require power conversion.

Radio system usage includes wireless RF systems (including base stations, relay stations, and hand-held transceivers) that use various technologies and protocols, including various types of orthogonal frequency-division multiplexing ("OFDM"), quadrature amplitude modulation ("QAM"), Code-Division Multiple Access ("CDMA"), Time-Division Multiple Access ("TDMA"), Wide Band Code Division Multiple Access ("W-CDMA"), Global System for Mobile Communications ("GSM"), Long Term Evolution ("LTE"), 5G, and WiFi (e.g., 802.11a, b, g, ac, ax), as well as other radio communication standards and protocols.

Fabrication Technologies & Options

In various embodiments of multi-level power converters, it may be beneficial to use specific types of capacitors, particularly for the fly capacitors. For example, it is generally useful for such capacitors to have low equivalent series resistance (ESR), low DC bias degradation, high capacitance, and small volume. Low ESR is especially important for multi-level power converters that incorporate additional switches and fly capacitors to increase the number of voltage levels. Selection of a particular capacitor should be made after consideration of specifications for power level, efficiency, size, etc. Various types of capacitor technologies may be used, including ceramic (including multi-layer ceramic capacitors), electrolytic capacitors, film capacitors (including power film capacitors), and IC-based capacitors. Capacitor dielectrics may vary as needed for particular applications, and may include dielectrics that are paraelectric, such as silicon dioxide ($SiO_2$), hafnium dioxide ($HFO_2$), or aluminum oxide $Al_2O_3$. In addition, multi-level power converter designs may beneficially utilize intrinsic parasitic capacitances (e.g., intrinsic to the power FETs) in conjunction with or in lieu of designed capacitors to reduce circuit size and/or increase circuit performance. Selection of capacitors for multi-level power converters may also take into account such factors as capacitor component variations, reduced effective capacitance with DC bias, and ceramic capacitor temperature coefficients (minimum and maximum temperature operating limits, and capacitance variation with temperature).

Similarly, in various embodiments of multi-level power converters, it may be beneficial to use specific types of inductors. For example, it is generally useful for the inductors to have low DC equivalent resistance, high inductance, and small volume.

The controller(s) used to control startup and operation of a multi-level power converter may be implemented as a microprocessor, a microcontroller, a digital signal processor (DSP), register-transfer level (RTL) circuitry, and/or combinatorial logic.

The term "MOSFET", as used in this disclosure, includes any field effect transistor (FET) having an insulated gate whose voltage determines the conductivity of the transistor, and encompasses insulated gates having a metal or metal-like, insulator, and/or semiconductor structure. The terms "metal" or "metal-like" include at least one electrically conductive material (such as aluminum, copper, or other metal, or highly doped polysilicon, graphene, or other electrical conductor), "insulator" includes at least one insulating material (such as silicon oxide or other dielectric material), and "semiconductor" includes at least one semiconductor material.

As used in this disclosure, the term "radio frequency" (RF) refers to a rate of oscillation in the range of about 3 kHz to about 300 GHz. This term also includes the frequencies used in wireless communication systems. An RF frequency may be the frequency of an electromagnetic wave or of an alternating voltage or current in a circuit.

With respect to the figures referenced in this disclosure, the dimensions for the various elements are not to scale; some dimensions have been greatly exaggerated vertically and/or horizontally for clarity or emphasis. In addition, references to orientations and directions (e.g., "top", "bottom", "above", "below", "lateral", "vertical", "horizontal", etc.) are relative to the example drawings, and not necessarily absolute orientations or directions.

Various embodiments of the invention can be implemented to meet a wide variety of specifications. Unless otherwise noted above, selection of suitable component values is a matter of design choice. Various embodiments of the invention may be implemented in any suitable integrated circuit (IC) technology (including but not limited to MOSFET structures), or in hybrid or discrete circuit forms. Integrated circuit embodiments may be fabricated using any suitable substrates and processes, including but not limited to standard bulk silicon, high-resistivity bulk CMOS, silicon-on-insulator (SOI), and silicon-on-sapphire (SOS). Unless otherwise noted above, embodiments of the invention may be implemented in other transistor technologies such as bipolar, BiCMOS, LDMOS, BCD, GaAs HBT, GaN HEMT, GaAs pHEMT, and MESFET technologies. However, embodiments of the invention are particularly useful when fabricated using an SOI or SOS based process, or when fabricated with processes having similar characteristics. Fabrication in CMOS using SOI or SOS processes enables circuits with low power consumption, the ability to withstand high power signals during operation due to FET stacking, good linearity, and high frequency operation (i.e., radio frequencies up to and exceeding 300 GHz). Monolithic IC implementation is particularly useful since parasitic capacitances generally can be kept low (or at a minimum, kept uniform across all units, permitting them to be compensated) by careful design.

Voltage levels may be adjusted, and/or voltage and/or logic signal polarities reversed, depending on a particular specification and/or implementing technology (e.g., NMOS, PMOS, or CMOS, and enhancement mode or depletion mode transistor devices). Component voltage, current, and power handling capabilities may be adapted as needed, for example, by adjusting device sizes, serially "stacking" components (particularly FETs) to withstand greater voltages, and/or using multiple components in parallel to handle greater currents. Additional circuit components may be added to enhance the capabilities of the disclosed circuits and/or to provide additional functionality without significantly altering the functionality of the disclosed circuits.

Circuits and devices in accordance with the present invention may be used alone or in combination with other components, circuits, and devices. Embodiments of the present invention may be fabricated as integrated circuits (ICs), which may be encased in IC packages and/or in modules for ease of handling, manufacture, and/or improved performance. In particular, IC embodiments of this invention are often used in modules in which one or more of such ICs are combined with other circuit components or blocks (e.g., filters, amplifiers, passive components, and possibly additional ICs) into one package. The ICs and/or modules are then typically combined with other components, often on a printed circuit board, to form part of an end product such as a cellular telephone, laptop computer, or electronic tablet, or to form a higher-level module which may be used in a wide variety of products, such as vehicles, test equipment, medical devices, etc. Through various configurations of modules and assemblies, such ICs typically enable a mode of communication, often wireless communication.

Programmed Embodiments

Some or all aspects of the invention may be implemented in hardware or software, or a combination of both (e.g., programmable logic arrays). Unless otherwise specified, the methods included as part of the invention are not inherently related to any particular computer or other apparatus. In particular, various general purpose computing machines may be used with programs written in accordance with the teachings herein, or it may be more convenient to use a special purpose computer or special-purpose hardware (such as integrated circuits) to perform particular functions. Thus, embodiments of the invention may be implemented in one or more computer programs (i.e., a set of instructions or codes) executing on one or more programmed or programmable computer systems (which may be of various architectures, such as distributed, client/server, or grid) each comprising at least one processor, at least one data storage system (which may include volatile and non-volatile memory and/or storage elements), at least one input device or port, and at least one output device or port. Program instructions or code are applied to input data to perform the functions described herein and generate output information. The output information is applied to one or more output devices, in known fashion.

Each such computer program may be implemented in any desired computer language (including machine, assembly, or high level procedural, logical, object oriented programming languages or a custom language/script) to communicate with a computer system, and may be implemented in a distributed manner in which different parts of the computation specified by the software are performed by different processors. In any case, the computer language may be a compiled or interpreted language. Computer programs implementing some or all of the invention may form one or more modules of a larger program or system of programs. Some or all of the elements of the computer program can be implemented as data structures stored in a computer readable medium or other organized data conforming to a data model stored in a data repository.

Each such computer program may be stored on or downloaded to (for example, by being encoded in a propagated signal and delivered over a communication medium such as a network) a tangible, non-transitory storage media or device (e.g., solid state memory media or devices, or magnetic or optical media) for a period of time (e.g., the time between refresh periods of a dynamic memory device, such as a dynamic RAM, or semi-permanently, or permanently), the storage media or device being readable by a general or special purpose programmable computer for configuring and operating the computer when the storage media or device is read by the computer system to perform the procedures described above. The inventive system may also be considered to be implemented as a non-transitory computer-readable storage medium, configured with a computer program, where the storage medium so configured causes a computer system to operate in a specific or predefined manner to perform the functions described above.

Conclusion

A number of embodiments of the invention have been described. It is to be understood that various modifications may be made without departing from the spirit and scope of the invention. For example, some of the steps described above may be order independent, and thus can be performed in an order different from that described. Further, some of the steps described above may be optional. Various activities described with respect to the methods identified above can be executed in repetitive, serial, and/or parallel fashion.

It is to be understood that the foregoing description is intended to illustrate and not to limit the scope of the invention, which is defined by the scope of the following claims, and that other embodiments are within the scope of the claims. In particular, the scope of the invention includes any and all feasible combinations of one or more of the processes, machines, manufactures, or compositions of matter set forth in the claims below. (Note that the parenthetical labels for claim elements are for ease of referring to such elements, and do not in themselves indicate a particular required ordering or enumeration of elements; further, such labels may be reused in dependent claims as references to additional elements without being regarded as starting a conflicting labeling sequence).

What is claimed is:

1. At least two converter cells, each converter cell including at least 3 node voltage levels and made by modifying a 2-level converter cell that includes either (1) at least 3 designed-in energy storage elements, the at least 3 designed-in energy storage elements including at least one designed-in inductance, and at least 2 initial switches, or (2) at least 1 designed-in inductance and at least 4 initial switches,
   wherein each converter cell includes a first pair of replacement switches replacing a first initial switch within the 2-level converter cell and a second pair of replacement switches replacing a second initial switch within the 2-level converter cell,
   wherein the first and second initial switches are not conductive at the same time during steady-state operation,
   wherein a first intermediate node between the first pair of replacement switches and a second intermediate node between the second pair of replacement switches are configured to be coupled to a capacitor,
   wherein each converter cell is coupled to a common input terminal and provides an output through one output designed-in inductance of the at least one designed-in inductances, and
   wherein the output of each converter cell is coupled to a common output terminal and the output designed-in inductances of at least two of the at least two converter cells are magnetically coupled with opposite poles.

2. The at least two converter cells of claim 1, wherein one of the first or second initial switches is a diode functioning as a switch.

3. The at least two converter cells of claim 1, wherein each of the 2-level converter cells is a 2-level non-isolated Ćuk converter cell.

4. The at least two converter cells of claim 1, wherein each of the 2-level converter cells is a 2-level isolated Ćuk converter cell.

5. The at least two converter cells of claim 1, wherein each of the 2-level converter cells is one of a 2-level single-ended primary-inductor converter (SEPIC) converter cell or a 2-level Zeta converter cell.

6. The at least two converter cells of claim 1, wherein each of the 2-level converter cells is a 2-level Flyback converter cell.

7. The at least two converter cells of claim 1, wherein each of the 2-level converter cells is a 2-level Forward converter cell.

8. A method for constructing at least two converter cells, each converter cell having at least 3 node voltage levels, by modifying a 2-level converter cell including either (1) at least 3 designed-in energy storage elements, the at least 3 designed-in energy storage elements including at least one designed-in inductance, and at least 2 initial switches, or (2) at least 1 designed-in inductance and at least 3 initial switches, the method including:
   (a) selecting a first initial switch and a second initial switch within each of the 2-level converter cells that are not conductive at the same time during steady-state operation;
   (b) splitting the selected first initial switch into a first 2 series-connected replacement switches, thereby forming a first intermediate node between the first 2 series-connected replacement switches; and
   (c) splitting the selected second initial switch into a second 2 series-connected replacement switches, thereby forming a second intermediate node between the second 2 series-connected replacement switches; and
   (d) coupling the formed first intermediate node and the formed second intermediate node through a capacitor;
   wherein each converter cell is coupled to a common input terminal and provides an output through one output designed-in inductance of the at least one designed-in inductances, and
   wherein the output of each converter cell is coupled to a common output terminal and the output designed-in inductances of at least two of the at least two converter cells are magnetically coupled with opposite poles.

9. The method of claim 8, wherein at least one of the first or second initial switches comprises a diode functioning as a switch.

10. The method of claim 8, wherein splitting the first or second selected initial switch into the respective first or second 2 series-connected switches comprises retaining the first or second selected initial switch and coupling the retained first or second initial switch in series with an added switch to form the respective first or second 2 series-connected replacement switches.

11. The method of claim 8, wherein the at least one designed-in inductance of the at least 3 designed-in energy storage elements includes 2 or more designed-in inductances.

12. The method of claim 8, wherein the at least 3 initial switches include 4 or more initial switches.

13. The method of claim 12, wherein each of the 2-level converter cells is a 2-level non-isolated Ćuk converter cell.

14. The method of claim 12, wherein each of the 2-level converter cells is a 2-level isolated Ćuk converter cell.

15. The method of claim 12, wherein each of the 2-level converter cells is one of a 2-level single-ended primary-inductor converter (SEPIC) converter cell or a 2-level Zeta converter cell.

16. The method of claim 12, wherein each of the 2-level converter cells is a 2-level Flyback converter cell.

17. The method of claim 12, wherein each of the 2-level converter cells is a 2-level Forward converter cell.

* * * * *